(12) United States Patent
Kondoh et al.

(10) Patent No.: US 11,645,027 B2
(45) Date of Patent: May 9, 2023

(54) INFORMATION PROCESSING SYSTEM AND METHOD FOR PROCESSING DATA OUTPUT REQUESTS AND IDENTIFICATION INFORMATION

(71) Applicants: Naritake Kondoh, Kanagawa (JP); Naohiko Kubo, Kanagawa (JP)

(72) Inventors: Naritake Kondoh, Kanagawa (JP); Naohiko Kubo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/496,762

(22) Filed: Oct. 8, 2021

(65) Prior Publication Data

US 2022/0113921 A1    Apr. 14, 2022

(30) Foreign Application Priority Data

Oct. 13, 2020    (JP) .............................. JP2020-172790

(51) Int. Cl.
 *G06F 3/12*    (2006.01)
(52) U.S. Cl.
 CPC .......... *G06F 3/1275* (2013.01); *G06F 3/1207* (2013.01); *G06F 3/1222* (2013.01); *G06F 3/1238* (2013.01); *G06F 3/1286* (2013.01)
(58) Field of Classification Search
 None
 See application file for complete search history.

(56) References Cited

U.S. PATENT DOCUMENTS 9,164,710 B2    10/2015  Kondoh et al.
9,348,994 B2     5/2016  Kondoh
(Continued)

FOREIGN PATENT DOCUMENTS

JP    2011065493 A  *  3/2011
JP    2017111799        6/2017
(Continued)

OTHER PUBLICATIONS

English translation of JP-2011065493-A. (Year: 2011).*
Extended European Search Report dated Mar. 16, 2022, in corresponding European Application 21201497.1.

*Primary Examiner* — Thomas D Lee
(74) *Attorney, Agent, or Firm* — Xsensus LLP

(57) ABSTRACT

An information processing system includes a program and an output system. The program causes an information processing device to function as a first communication unit configured to transmit, to the output system, an output request of data, and to receive, from the output system, identification information for identifying the output request of the data. The output system includes a processing control unit configured to acquire the identification information issued for the output request of the data in response to the output request from the information processing device, a second communication unit configured to transmit, to the information processing device, the identification information acquired by the processing control unit, and a third communication unit configured to transmit, to an output device, the data acquired from a storage destination associated with the identification information, upon receiving from the output device the output request of the data with the identification information being designated.

12 Claims, 20 Drawing Sheets

(56) References Cited

U.S. PATENT DOCUMENTS

| | | | |
|---|---|---|---|
| 10,171,685 B2 | 1/2019 | Yamada et al. | |
| 10,225,434 B2 | 3/2019 | Kondoh | |
| 2015/0205547 A1* | 7/2015 | Shiraga | G06F 3/1238 358/1.14 |
| 2015/0205549 A1 | 7/2015 | Miyata | |
| 2015/0205559 A1* | 7/2015 | Miyata | G06F 3/1288 358/1.15 |
| 2020/0241807 A1 | 7/2020 | Kondoh | |
| 2021/0105375 A1 | 4/2021 | Hayashi | |
| 2021/0112143 A1 | 4/2021 | Kondoh | |

FOREIGN PATENT DOCUMENTS

| | | |
|---|---|---|
| JP | 2021-060974 | 4/2021 |
| WO | 2013/052641 A1 | 4/2013 |

\* cited by examiner

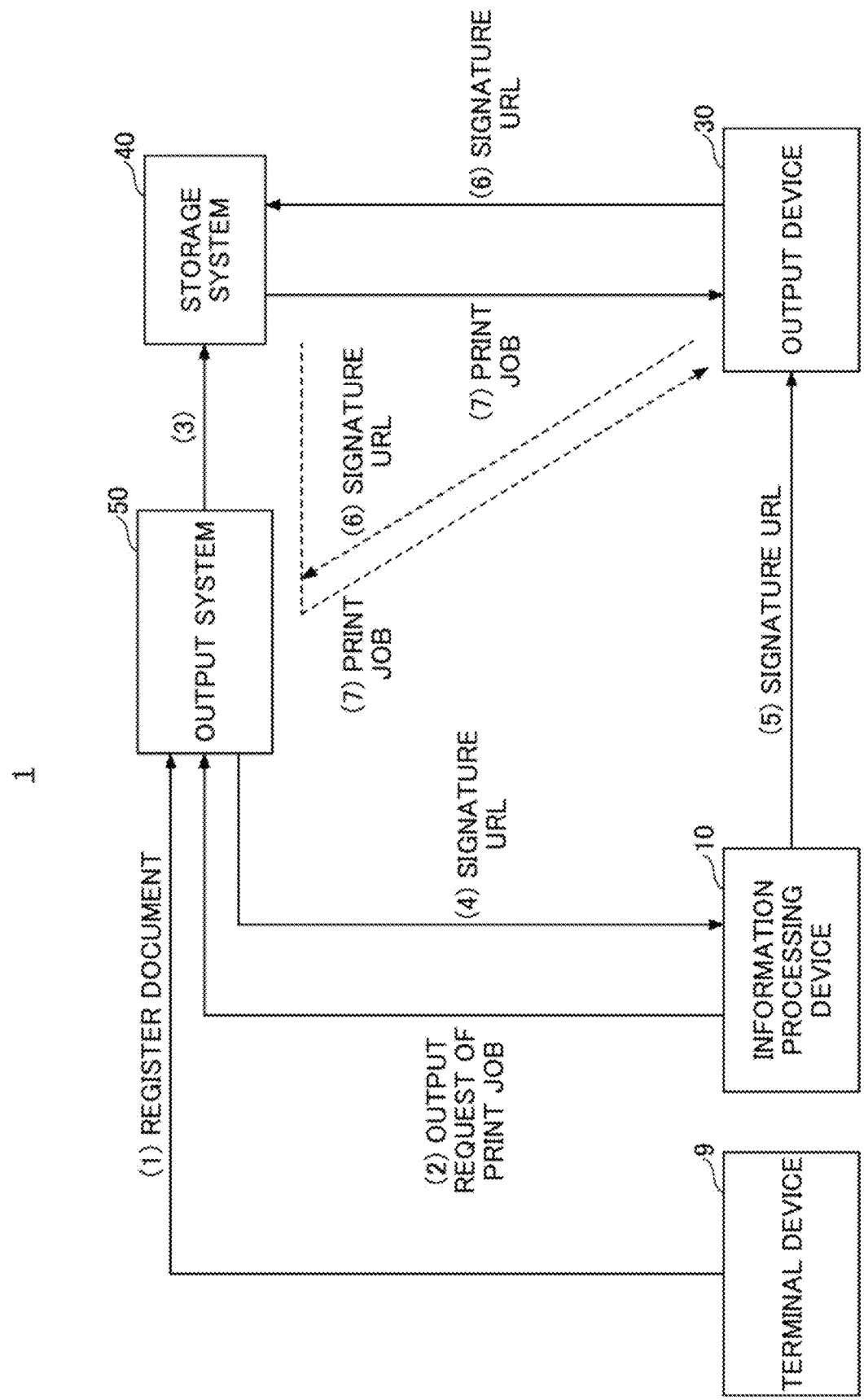

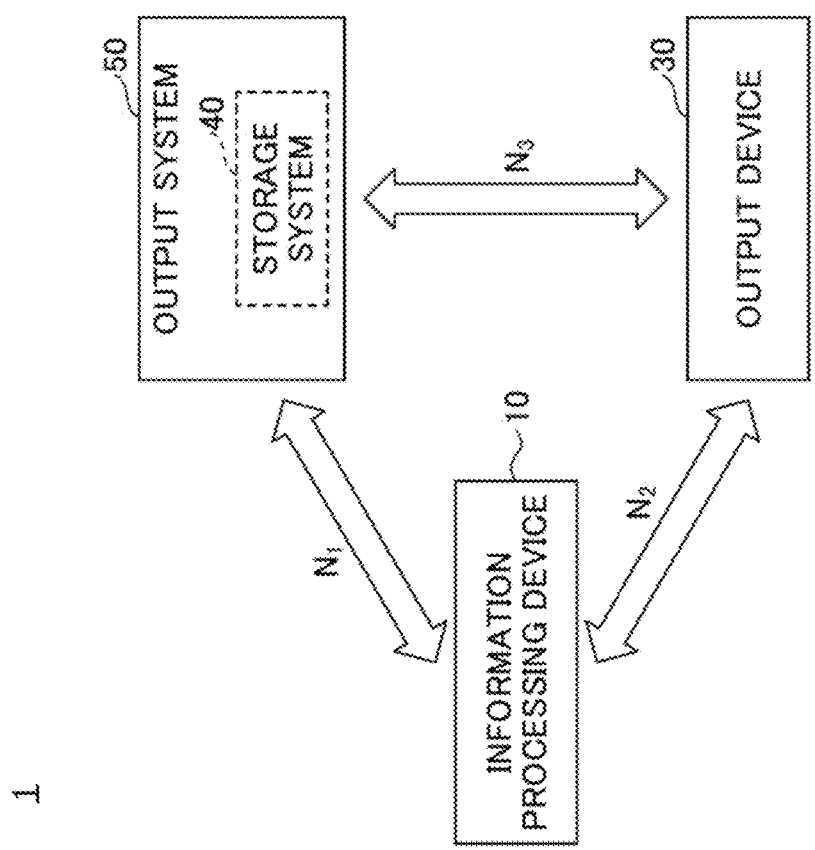

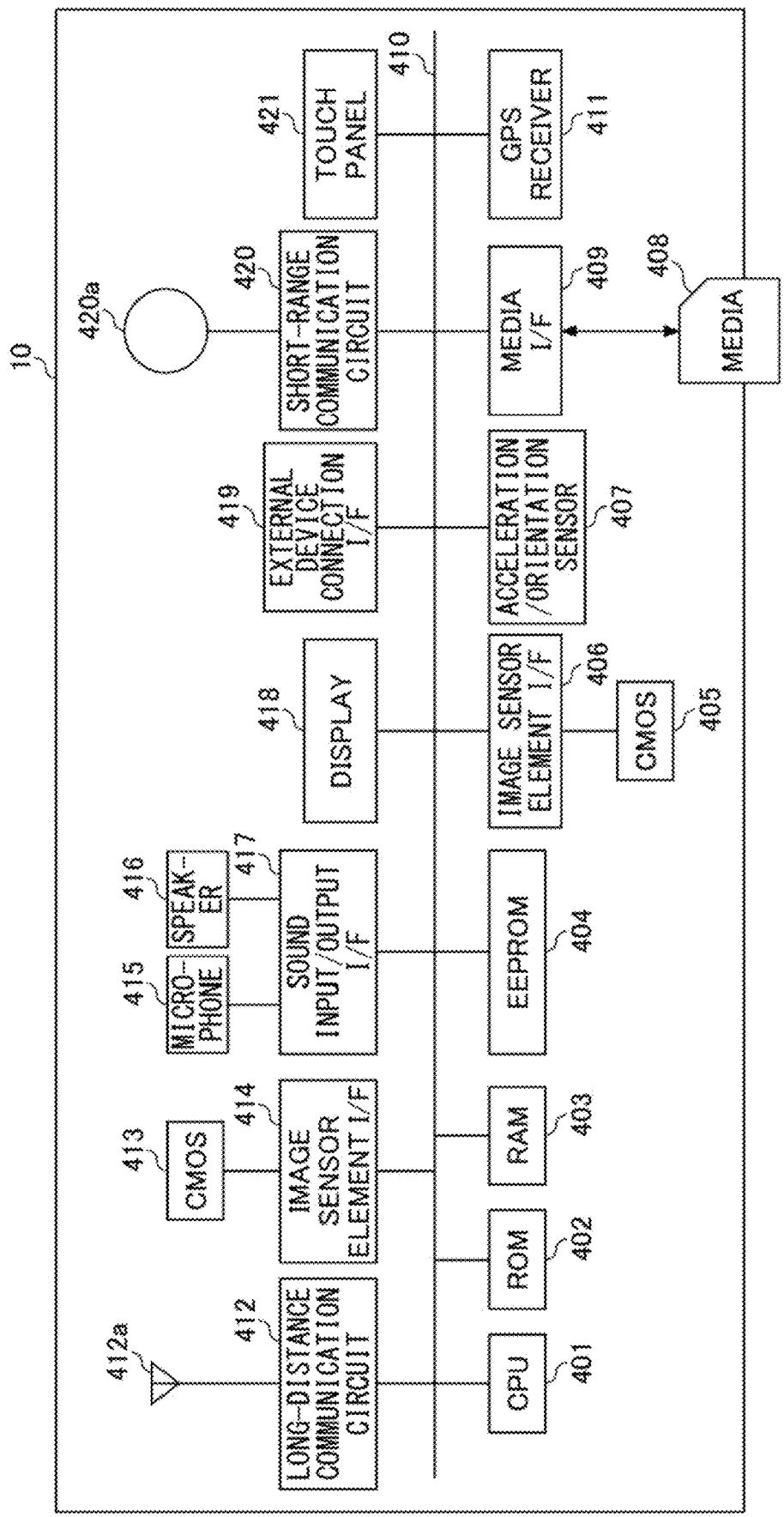

FIG.7A https://xxxxxxxxxx.domain.net/index.html?Expires=1111111111&Signature=MIIC4TCCAckCAQAwbDEQMA4GA1UEB
hMHVW5rbm93bjEQMA4GA1UECBMHVW5rbm93
bjEQMA4GA1UEhMHVW5rbm93bjEQMA4GA1UEChMHVW5rbm93bjEQMA4GA1UECxMH
VW5rbm93bjEQMA4GA1UEAxMHVW5rbm93bjCCASIwDQYJKoZIhvcNAQEBBQAD
ADCCAQoCggEBAL/x4IdX8m4wmV+b74S/nTMgr3qwPU6fni+1S/H+JbEqe&Key-Pair-Id=XXXXXXXXXXXXXXXXXXXX

FIG.7B

| ID | TIME LIMIT | FILE PATH | USER RESTRIC-TION |
|---|---|---|---|
| 253902AD9CE94EDE908F3633651OFECD | 2020/10/01 10:00:00:000 | http://storage.com/xxxxx/1111111 | YES |
| 1BAE753251E4423EAE2E9112FA273DF7 | 2020/10/01 11:00:00:000 | http://storage.com/xxxxx/2222222 | NO |
| CF3B08FC3B5342DE80842A35BAA5560B | 2020/10/01 10:30:00:000 | http://storage.com/xxxxx/3333333 | NO |
| 66C35967F2D94207979BF82D18809880 | 2020/10/01 10:00:40:000 | http://storage.com/xxxxx/4444444 | YES |
| 680E0458898A414691A4FD099F44547E | 2020/10/01 10:42:31:000 | http://storage.com/xxxxx/5555555 | NO |

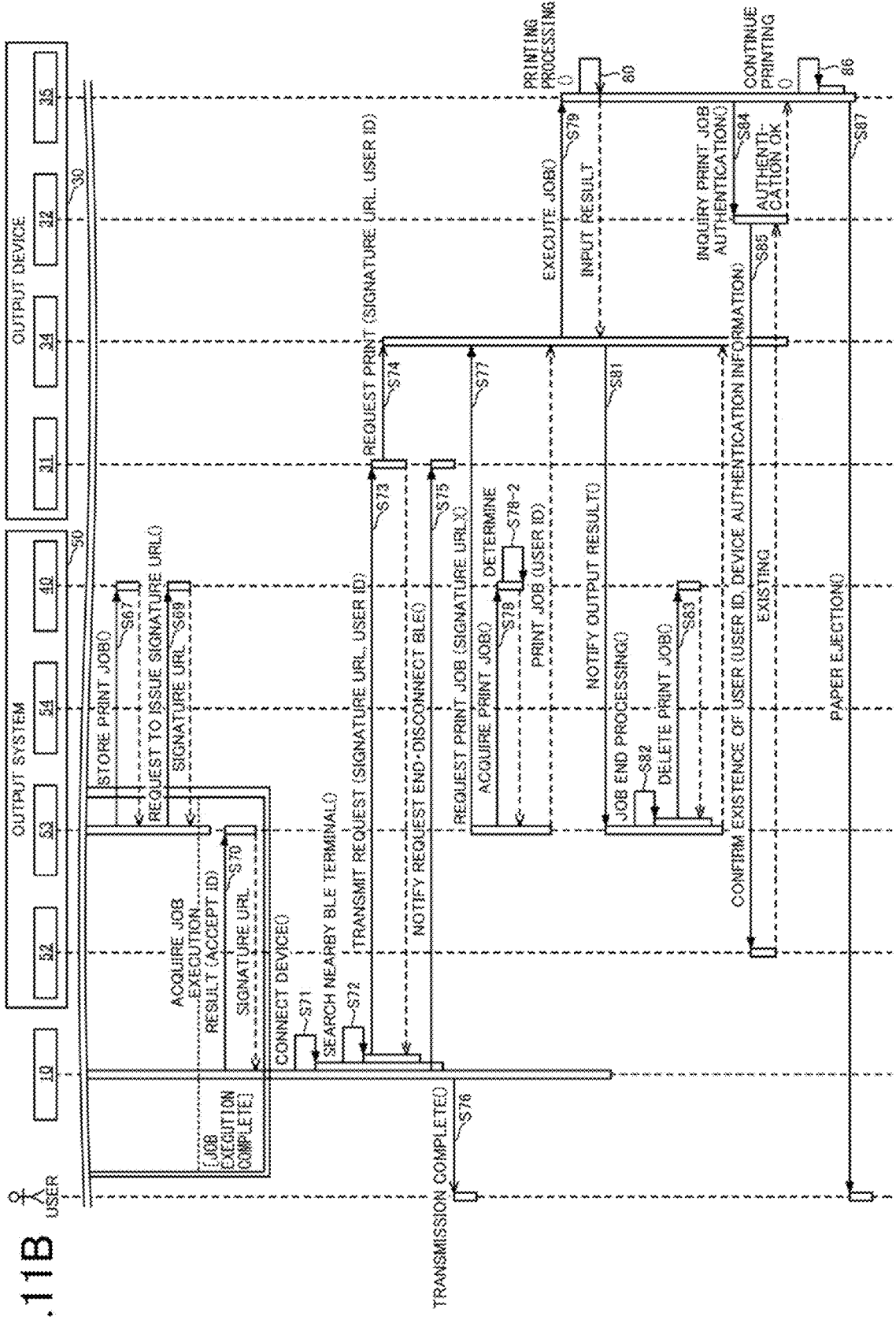

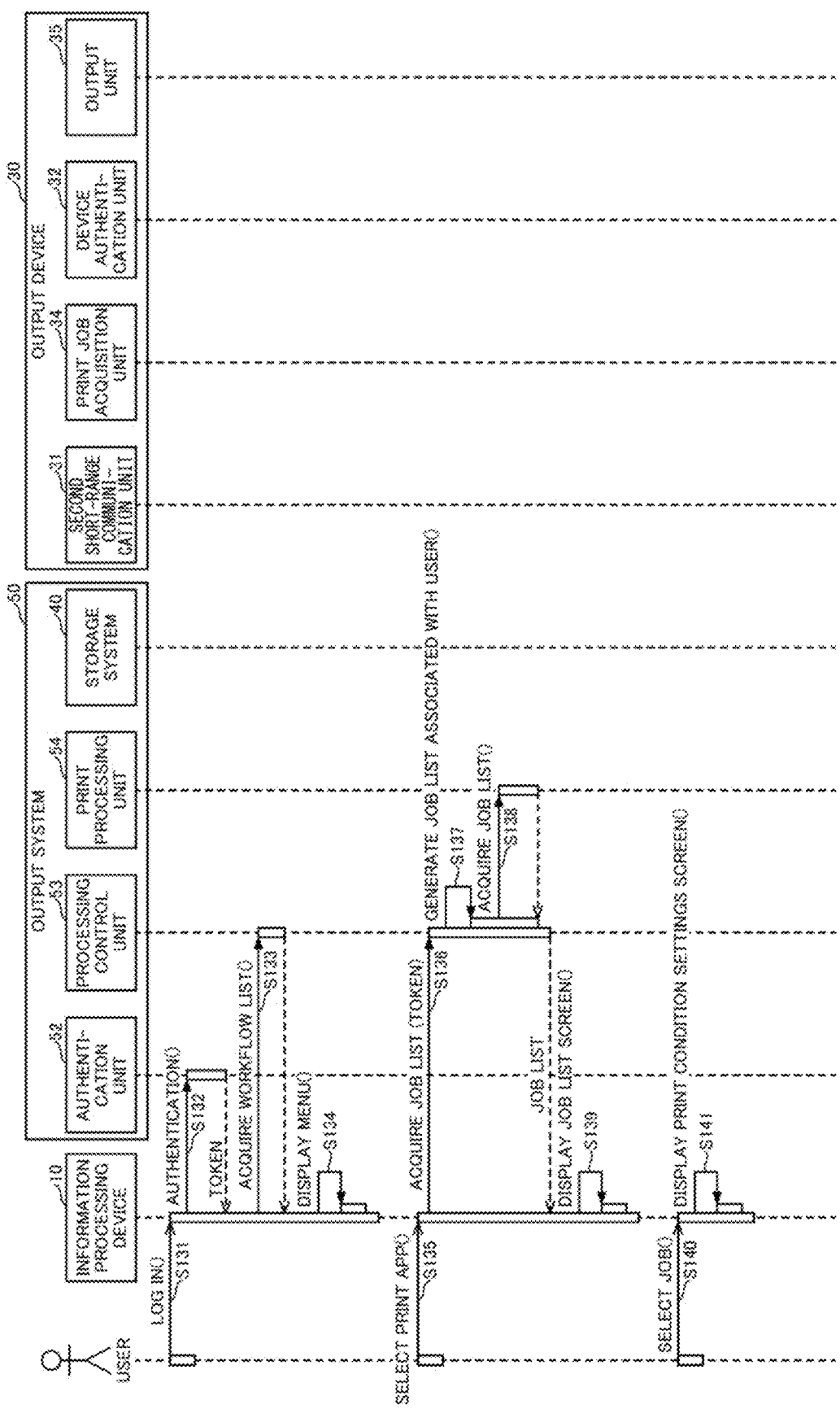

FIG.14

| OUTPUT SYSTEM ID | 12345 |
|---|---|
| URL | https://... |
| USER NAME | ichiro |
| PASSWORD | ***** |

FIG.15

| DOCUMENT ID | TENANT ID | USER ID | DOCUMENT NAME | PRINT DATA PATH | THE NUMBER OF PAGES | ... |
|---|---|---|---|---|---|---|
| 1 | 12345678 | UserA | Document.doc | http://host.domain/files/xxxxxxx | 10 | |
| 2 | 987654321 | UserB | Sheet.xls | http://host.domain/files/yyyyyyy | 3 | |
| 3 | 567891234 | UserC | File.pdf | http://host.domain/files/zzzzzzz | 4 | |
| 4 | 12345678 | UserD | Image.img | http://host.domain/files/aaaaaaa | 1 | |

FIG.16

| # | jobID | SIGNATURE URL FOR RESULT ACQUISITION | SIGNATURE URL OF STORAGE SERVICE |
|---|---|---|---|
| 1 | XXXXX | https://domain.com/wfservice/result/B962226D-4EF8-4164-B14F-96CF26DC04D7 | https://domain.com/tempstorage/3AC3872A-C2E4-4DD4-A496-3E75A48B3D5C |
| 2 | YYYYY | https://domain.com/wfservice/result/12B1D937-3FD8-4C25-879E-46F157C9A8C7 | https://domain.com/tempstorage/D3373BD0-B712-47D9-9BB9-8E414EA5AFA4 |
| 3 | ZZZZZ | https://domain.com/wfservice/result/398B7E1C-F99F-4EB2-9A54-14803FE4ED53 | https://domain.com/tempstorage/3F3B9866-E8DD-4BF8-9565-D139504BFB7D |

FIG.17

| ITEM | DESCRIPTION |
|---|---|
| TENANT ID | ID OF TENANT TO WHICH USER BELONGS |
| USER ID | 0123 |
| PASSWORD | **** |
| LAST NAME | PATENT |
| FIRST NAME | TARO |
| E-MAIL ADDRESS | aaa@bb.cc |
| DISPLAY LANGUAGE (LOCALE) | JAPANESE |
| ACCOUNT STATUS | VALID / INVALID / ACCOUNT LOCKED |
| ROLE | ADMINISTRATOR OR GENERAL USER |
| APP USAGE PERMISSION | APP A, APP B |

INFORMATION PROCESSING SYSTEM AND METHOD FOR PROCESSING DATA OUTPUT REQUESTS AND IDENTIFICATION INFORMATION

CROSS-REFERENCE TO RELATED APPLICATIONS

The present application claims priority under 35 U.S.C. § 119 to Japanese Patent Application No. 2020-172790, filed on Oct. 13, 2020, the entire contents of which are incorporated herein by reference.

BACKGROUND OF THE INVENTION

1. Field of the Invention

The disclosures herein relate to an information processing system, output system, output method, and recording medium.

2. Description of the Related Art

A pull printing service (also referred to as location-free printing, secure printing, etc.) is known in which a print job is sent from an information processing device operated by a user to an output system on a network and the user downloads the print job of the output system from any output device to print.

A technique has been devised that allows the user to easily designate a print job registered in the output system (for example, refer to Patent Document 1). Patent Document 1 discloses a system in which a server transmits a temporary code to a terminal device in response to acquisition of a print job, and a user who owns an information processing device inputs the temporary code into an output device so that the output device receives a corresponding print job to print from the server based on the temporary code.

However, in the related-art, there is a problem that the information processing device is required to transmit an authentication information to the output device. For example, when the user directly operates the output device to acquire the print job from the output system for printing, the user inputs the authentication information to the output device. However, printing regardless of the output device which is often shared by multiple users is desired. To implement this, communicating between the information processing device and the output device is effective. On the other hand, the information processing device carried by the user and the output device which is a facility on a company side, are not connected to the same network (wireless LAN, 4G, 5G, etc.) for security reasons. In consideration of the above, without connecting the information processing device to the same network as the output device, communicating by short-range wireless communication in which the information processing device and the output device can communicate with each other is considered. However, in short-range wireless communication, if there is a terminal confusable with the output device, the authentication information transmitted by the information processing device may be leaked. If the authentication information is leaked, a security risk occurs, in which various operations may be performed in place of the user.

In view of the above problems, an object of the present disclosure is to provide an information processing system capable of executing processing by an output device without the information processing device transmitting authentication information to the output device.

RELATED-ART DOCUMENTS

Patent Documents

Patent Document 1: Japanese Laid-Open Patent Application No. 2017-111799

SUMMARY OF THE INVENTION

In view of the above problems, the present disclosure relates to an information processing system that includes a program and an output system. The program causes an information processing device to function as a first communication unit configured to transmit, to the output system, an output request of data, and to receive, from the output system, identification information for identifying the output request of the data. The output system includes a processing control unit configured to acquire the identification information issued for the output request of the data in response to the output request from the information processing device, a second communication unit configured to transmit, to the information processing device, the identification information acquired by the processing control unit, and a third communication unit configured to transmit, to an output device, the data acquired from a storage destination associated with the identification information, upon receiving from the output device the output request of the data with the identification information being designated.

An information processing system can be provided capable of executing processing by an output device without the information processing device transmitting authentication information to the output device.

BRIEF DESCRIPTION OF THE DRAWINGS

FIG. 1 is an example of a diagram illustrating a schematic operation of an information processing system;

FIGS. 2A and 2B are examples of a system configuration diagram of the information processing system;

FIG. 3 is an example of a hardware configuration diagram of an information processing device;

FIGS. 7A and 7B are diagrams illustrating a signature URL;

FIG. 11B is an example of a sequence diagram illustrating a procedure for the user to print the print job (document) registered in the output system from the output device when the output device requires the user ID to execute the print job (No. 2);

FIG. 13 is an example of a sequence diagram illustrating a procedure for the user to print the print job (document) registered in the output system from the output device by executing an application in a form of the workflow;

FIG. 14 schematically illustrates an example of registration destination information;

FIG. 15 illustrates information stored in a print job storage unit;

FIG. 16 illustrates an example of a result acquisition URL associated with the signature URL; and FIG. 17 is an example of user information corresponding to the application in the form of the workflow.

DESCRIPTION OF THE EMBODIMENTS

Figure 2A:
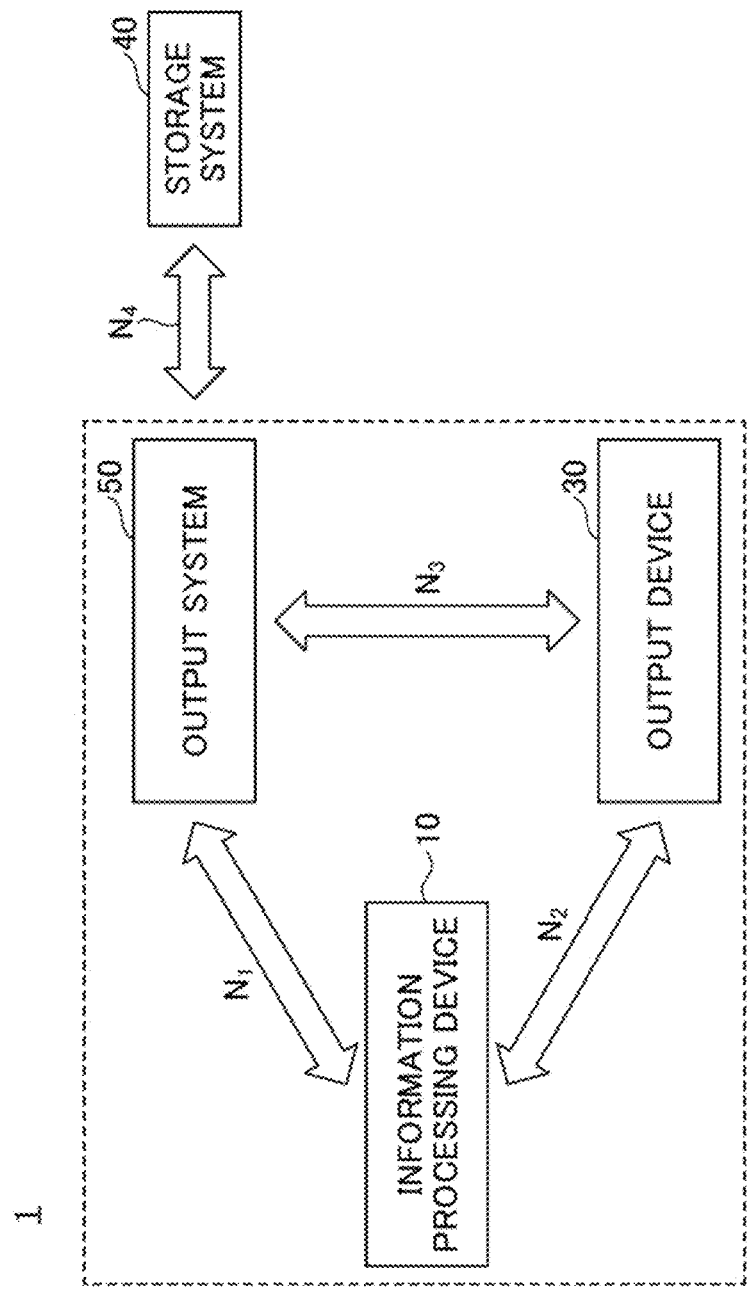

Hereinafter, as an example of an embodiment for implementing the present disclosure, the information processing system and the output method performed by the information processing system will be described with reference to the drawings.

Embodiment 1

<Outline of Information Processing System of Embodiment 1>

FIG. 1 is an example of a diagram illustrating a schematic operation of an information processing system 1. The user carries an information processing device 10 and executes a print job by a pull printing using an output system 50 and an output device 30.

(1) The user logs in to the output system 50 and transmits a document or the like created by operating a terminal device 9 to the output system 50 so that the document can be pull-printed. In the terminal device 9, a Web browser is running or an application is running, and such as a Uniform Resource Locator (URL) of the output system 50 is set.

When the output system 50 accepts the document, the output system 50 numbers information for identifying the document (hereinafter, referred to as a document ID) to store in the output system 50. The registered document is treated as a print job.

(2) Next, when the document is desired to be printed, for example, the user operates the information processing device 10. The information processing device 10 can be connected to a public line (a cellular line) such as a mobile phone network or a network such as a LAN. The user operates the information processing device 10 to log in to the output system 50, and the information processing device 10 receives a list of print jobs managed by the output system 50. In the information processing device 10, an application (hereinafter, referred to as an app) capable of requesting the output system 50 to output the print job is running. The user can transmit the document and execute the print job by using either the terminal device 9 or the information processing device 10 without distinguishing the terminal device 9 and the information processing device 10. When the user selects one or more print jobs, the information processing device 10 transmits an output request for the print job to the output system 50.

(3) The output system 50 stores the print job in a storage system 40 that does not require authentication in response to the output request for the print job. Since the storage system 40 does not require authentication, any user can access to the storage system 40.

(4) When the data is saved successfully, the output system 50 transmits a signature URL indicating the storage location of the print job in the storage system 40 to the information processing device 10. The signature URL will be described later.

(5) The information processing device 10 searches for the output device 30 by short-range wireless communication, and transmits the signature URL by short-range wireless communication when the output device 30 is found.

(6) The output device 30 designates the signature URL to request the print job to the storage system 40. Since the storage system 40 does not require authentication, the output device 30 is not required to transmit the user ID and password of the user to the storage system 40. The output device 30 may acquire the print job via the output system 50.

(7) The storage system 40 transmits the print job associated with the signature URL to the output device 30. The output device 30 can execute the received print job to print the document on paper.

As described above, in the present embodiment, since the print job is stored in the storage system 40 that does not require authentication, transmitting the authentication information from the information processing device 10 to the output device 30 is not required. Therefore, there is no risk of the authentication information being leaked. Even if the signature URL is leaked, since any user can access only the print job for which printing is requested with the signature URL, the leaked information can be minimized. In the first place, since the signature URL can limit an access period and an IP address of the accessing terminal, the risk when the signature URL is leaked can be reduced. Further, the user is not required to be involved in the output device 30 operated by an unspecified number of people. Further, the user is not required to connect the information processing device 10 to the same network as the output device 30.

Terminology

The data output request is a request to output the data to external. The data may be processed or may be output without any processing. As a form of output, data may be printed. In the present embodiment, the data is described by the term print job.

The print job is a process that serves as an execution unit when the output device 30 prints the document data requested to be printed. The print job includes at least document data and may also include print settings. The job of an image forming device is called a print job, but in other devices, a job with a name corresponding to the function of the device is executed. The document data may include not only characters but also images, figures, and the like. Alternatively, the document data may consist of only images.

Identification information for identifying the data output request is not the data but identification information given to the output request. The identification information is given to the data (for example, the print job), and the identification information of the data does not change, but the identification information for identifying the data output request changes with each output request. In the present embodiment, the identification information is described by the term signature URL.

A storage destination that does not require authentication means that any user can access from the terminal without the user ID or password.

The authentication information is any character string agreed in advance that notifies a computer of the access of a proper user. The authentication information refers to, for example, a password, a passcode, or a secret word. Further, biometric authentication information such as fingerprints, IC card information held by the user, and the like may be also included.

A token is a user's authority information. The token is associated with the user logged in with the authentication information. Alternatively, the token may include information capable of identifying the user. By identifying the user by the token, the user's authority (such as displaying, printing, editing of the print job) is also determined. The token may include the authority of the user.

The token is held in both a terminal of the user (the information processing device in the present embodiment) and an authentication server (the output system in the present embodiment). The user can log in with only the token without authentication information until an elapse of predetermined time (determined by the authentication server) from an issuance of the token. After the elapse of the predetermined time, the authentication server invalidates or destroys the token, so the user is required to log in with the authentication information.

<System Configuration Example>

FIG. 2 is an example of a system configuration diagram of the information processing system 1 in the present embodiment. The information processing system 1 of FIG. 2A includes the information processing device 10, the output system 50, and the output device 30. The information processing system 1 can also communicate with the storage system 40. Since the document can be registered by the information processing device 10, the terminal device 9 used for document registration in FIG. 1 is omitted.

The information processing device 10 and the output system 50 communicate with each other via a network N1. The network N1 of the present embodiment is a network using public lines such as 3G, 4G, 5G, and LTE. The public line is a line that is physically shared and used by an unspecified user in a communication line connecting bases. An example includes a mobile phone network and a PHS communication network. The information processing device 10 can be connected to an access point via a wireless LAN such as Wi-Fi to communicate with the output system 50 via the Internet or can communicate by wire with the output system 50.

The information processing device 10 and the output device 30 communicate with each other via a network N2. The network N2 of the present embodiment is a network using short-range wireless communication such as Near Field Communication (NFC), Bluetooth (registered trademark), and Bluetooth Low Energy (registered trademark). The information processing device 10 and the output device 30 may communicate with TCP/IP communication. The network N2 may also be infrared communication, visible light communication, or the like.

The output device 30 and the output system 50 communicate with each other via a network N3. The network N3 of the present embodiment is assumed to be a LAN constructed in a facility where the output device 30 and the output system 50 are installed, a WAN including multiple LANs, the Internet, and the like. The output device 30 and the output system 50 preferably communicate with each other. The network N3 may be constructed either wired or wireless, and may be a combination of wired and wireless. Further, the output device 30 may be connected to the public line to communicate with the output system 50.

The output system 50 and the storage system 40 communicate with each other via a network N4. The network N4 of the present embodiment is a network such as the Internet, the wide area LAN, or a Virtual Private Network (VPN). The output system 50 and the storage system 40 can communicate with each other by using an Application Interface (API) or the like as needed.

The information processing device 10 includes a function as a computer, and an app which will be described later is running. The app includes a function of registering the print job in the output system 50 or acquiring (downloading) the print job to display in a list. Further, the information processing device 10 may include a function of editing or deleting the print job. Further, in addition to this app, the information processing device 10 operates a general app that assists the user in creating document data or acquires the document data from the Internet. Further, the app running on the information processing device 10 includes a function of causing the output device 30 to print the print job stored in the output system 50 (starting a communication with the output device 30 and causing the output system 50 to transmit the print job to the output device 30).

Specifically, the information processing device 10 includes a smartphone, a mobile phone, a tablet terminal, a game machine, a Personal Digital Assistant (PDA), a digital camera, a wearable Personal Computer (PC), a PC, and the like. The information processing device 10 is not limited to these.

The output system 50 includes, for example, one or more information processing devices on the Internet. The information processing device on a network may be referred to as a server. The server is a computer or software that functions to provide information or a processing result in response to a request from a client.

The output system 50 stores the print job transmitted from the information processing device 10, and also transmits the print job to the output device 30 in response to the request from the output device 30. The output system 50 may be provided on the Internet or on-premises. If the output system 50 is provided on the Internet, the output system 50 preferably supports cloud computing. The cloud is a term used when a particular hardware resource is not intended. The output system 50 may be referred to as a cloud system, a server system, or the like.

Further, the output system 50 includes a storage for storing the print job. The storage may be a storage used by a service that provides users with disk space on the Internet. The output system 50 may be referred to as online storage. The output system 50 can be used by both a general user and a company. In the case of the company, a file server environment is not required to be built in-house, and the capacity can be increased or decreased as much as required.

The storage system 40 includes one or more information processing devices. The storage system 40 is a storage capable of being accessed by any user without authentication. Since authentication is not required, the output device 30 is not required to transmit the user ID and password. On the other hand, accessing to the output system 50 (or a storage of the output system 50) requires authentication. A program that manages a file is running in the storage system 40, and the program issues the signature URL, which will be described later, and restricts access to the print job.

The storage system 40 may be a storage used in a service that provides a user with disk space on the Internet. For example, the storage system may be AWS S3, Google Drive (registered trademark), Amazon Cloud Drive (registered trademark), Dropbox (registered trademark), or the like. Further, the output system 50 and the storage system 40 may be separate. The term "separate" means that an operating source is different, a user authentication is required separately, or the output system 50 is charged for use of the storage system 40.

The output device 30 may be a printer, an image forming device, an image processing device, a copying machine, a multifunction peripheral, a Multi-function Peripheral/Product/Printer (MFP), or the like, which executes the print job. In the present embodiment, the output device 30 preferably includes a printer function.

Further, the output device 30 may be a device including a function of outputting data other than the printer function. The output device 30 may be, for example, a projector, a Head Up Display (HUD) device, an electronic blackboard, digital signage, or the like. In the case of these devices, the output device 30 outputs data such as video, a document, and music acquired from the output system 50 (display, playback, etc.).

Further, the output device 30 is not limited to the printer or the like as long as a device including a communication function. For example, the output device 30 may be an Industrial machine, an imaging device, a sound collector, a medical device, a network home appliance, an automobile (Connected Car), a laptop PC, a mobile phone, a smartphone, a tablet terminal, a game machine, a PDA, a digital camera, a Wearable PC, desktop PC, or the like.

In FIG. 2A, the output system 50 and the storage system 40 are separate, but a system configuration in which the output system 50 includes the storage system 40 is also possible. FIG. 2B illustrates a configuration example of the information processing system in which the output system 50 includes a storage system 40. In this case as well, the storage system 40 can be accessed by the user without authentication. The storage system 40 is only required to be accessible by the user without authentication.

<Hardware Configuration>

Next, a hardware configuration of the information processing system will be described with reference to FIG. 3 to FIG. 5.

<<Information Processing Device>>

FIG. 3 is a hardware configuration diagram of the information processing device 10. As illustrated in FIG. 3, the information processing device 10 includes a CPU 401, a ROM 402, a RAM 403, an EEPROM 404, a CMOS sensor 405, an image sensor element I/F 406, an acceleration/orientation sensor 407, a media I/F 409, and a GPS receiver 411.

The CPU 401 controls an operation of the entire information processing device 10. The ROM 402 stores programs used to drive the CPU 401 such as an Initial Program Loader (IPL). The RAM 403 is used as a work area of the CPU 401. The EEPROM 404 reads or writes various data such as a program (app) for the information processing device 10 according to the control of the CPU 401. The Complementary Metal Oxide Semiconductor (CMOS) sensor 405 is a kind of built-in imaging means for acquiring image data by imaging a subject (mainly for self-view) according to the control of the CPU 401. The CMOS sensor may be an imaging means such as a Charge Coupled Device (CC) sensor. The image sensor element I/F 406 is a circuit that controls the drive of the CMOS sensor 405. The acceleration/orientation sensor 407 is a variety of sensors such as an electronic magnetic compass or a gyro compass that detects the geomagnetism, and an acceleration sensor. The media I/F 409 controls reading or writing (storage) of data with respect to a storage medium 408 such as a flash memory. The GPS receiver 411 receives GPS signals from GPS satellites.

Further, the information processing device 10 includes a long-distance communication circuit 412, a CMOS sensor 413, an image sensor element I/F 414, a microphone 415, a speaker 416, a sound input/output I/F 417, a display 418, an external device connection I/F (Interface) 419, a short-range communication circuit 420, an antenna 420a of the short-range communication circuit 420 and a touch panel 421.

The long-distance communication circuit 412 is a circuit that communicates with other devices via the network N1. The CMOS sensor 413 is a kind of built-in imaging means for acquiring image data by imaging a subject according to the control of the CPU 401. The image sensor element I/F 414 is a circuit that controls the drive of the CMOS sensor 413. The microphone 415 is a built-in circuit that converts sound into an electric signal. The speaker 416 is a built-in circuit that converts an electric signal into physical vibration to produce sounds such as music and voice. The sound input/output I/F 417 is a circuit that processes sound signal input/output between the microphone 415 and the speaker 416 according to the control of the CPU 401. The display 418 is a kind of display means such as a liquid crystal display or an organic Electro Luminescence (EL) for displaying an image of a subject, various icons, and the like. The external device connection I/F 419 is an interface for connecting various external devices. The short-range communication circuit 420 is a communication circuit such as NFC or Bluetooth (registered trademark). The touch panel 421 is a kind of input means for operating the information processing device 10 by the user pressing the display 418.

Further, the information processing device 10 includes a bus line 410. The bus line 410 is such as an address bus or a data bus for electrically connecting each component such as the CPU 401 illustrated in FIG. 3.

<<Output System>>

Figure 4:
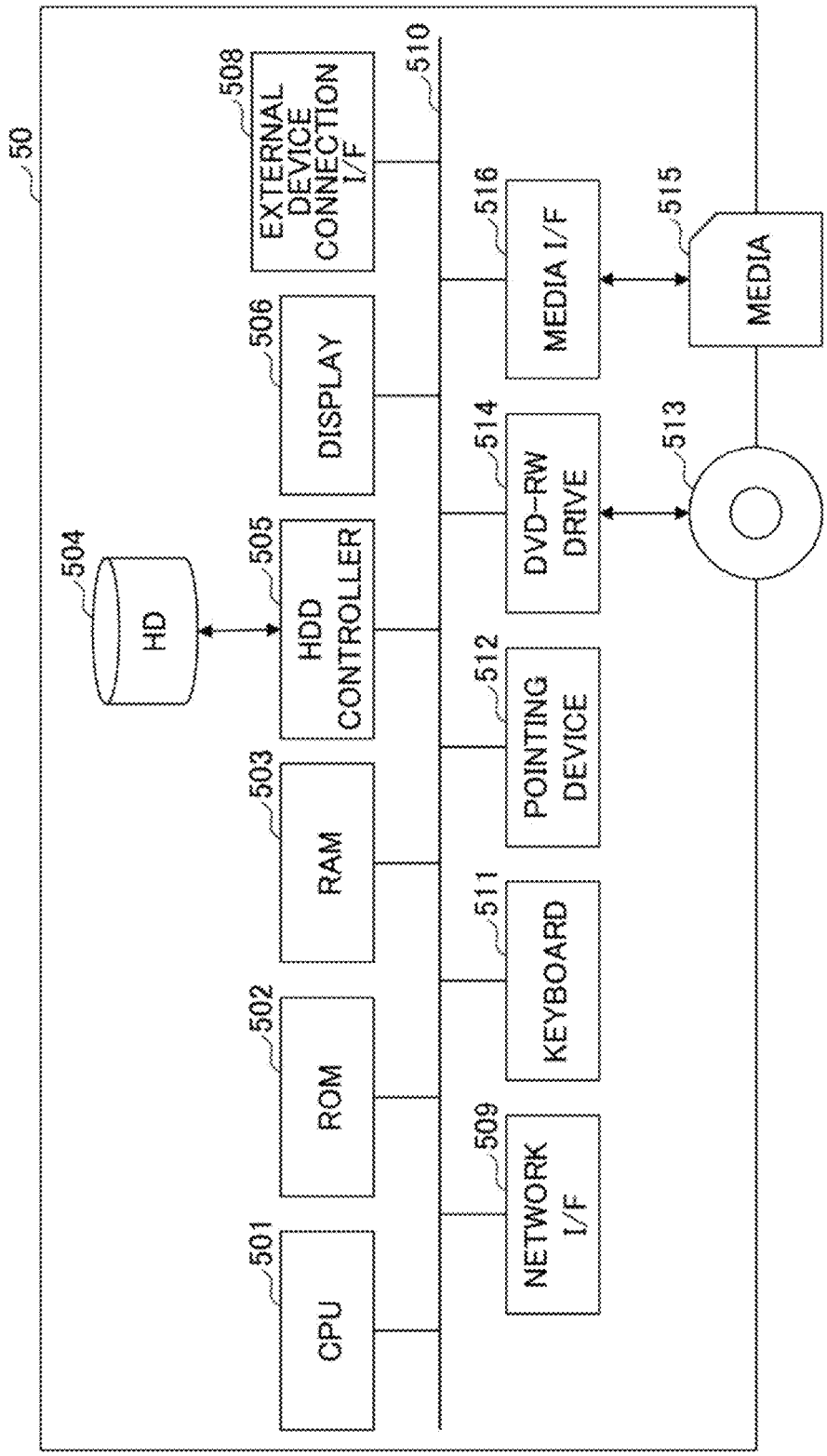
FIG. 4 is an example of a hardware configuration diagram of an output system.

FIG. 4 is a hardware configuration diagram of the output system 50. As illustrated in FIG. 4, the output system 50 is constructed by a computer. As illustrated in FIG. 4, the output system 50 includes a CPU 501, a ROM 502, a RAM 503, an HD 504, a Hard Disk Drive (HDD) controller 505, a display 506, an external device connection I/F (Interface) 508, a network I/F 509, a bus line 510, a keyboard 511, a pointing device 512, a Digital Versatile Disk Rewritable (DVD-RW) drive 514, and a media I/F 516.

The CPU 501 controls an operation of the entire output system 50. The ROM 502 stores programs used to drive the CPU 501 such as an IPL. The RAM 503 is used as a work area of the CPU 501. The HD 504 stores various data such as programs. The HDD controller 505 controls reading or writing of various data with respect to the HD 504 according to the control of the CPU 501. The display 506 displays various information such as cursors, menus, windows, characters, or images. The external device connection I/F 508 is an interface for connecting various external devices. The external device in this case is, for example, a Universal Serial Bus (USB) memory, a printer, or the like. The network I/F 509 is an interface for data communication using the networks N1 and N3. The bus line 510 is such as an address bus or a data bus for electrically connecting each component such as the CPU 501 illustrated in FIG. 4.

Further, the keyboard 511 is a kind of input means including multiple keys used for inputting characters, numerical values, various instructions, and the like. The pointing device 512 is a kind of input means for selecting and executing various instructions, selecting a processing target, and moving a cursor. The DVD-RW drive 514 controls reading or writing of various data to the DVD-RW 513 as an example of a removable recording medium. Note that the DVD-RW drive 514 may be such as a DVD-R. The media I/F 516 controls reading or writing (storage) of data to a recording medium 515 such as a flash memory.

<<Output Device>>

Figure 5:
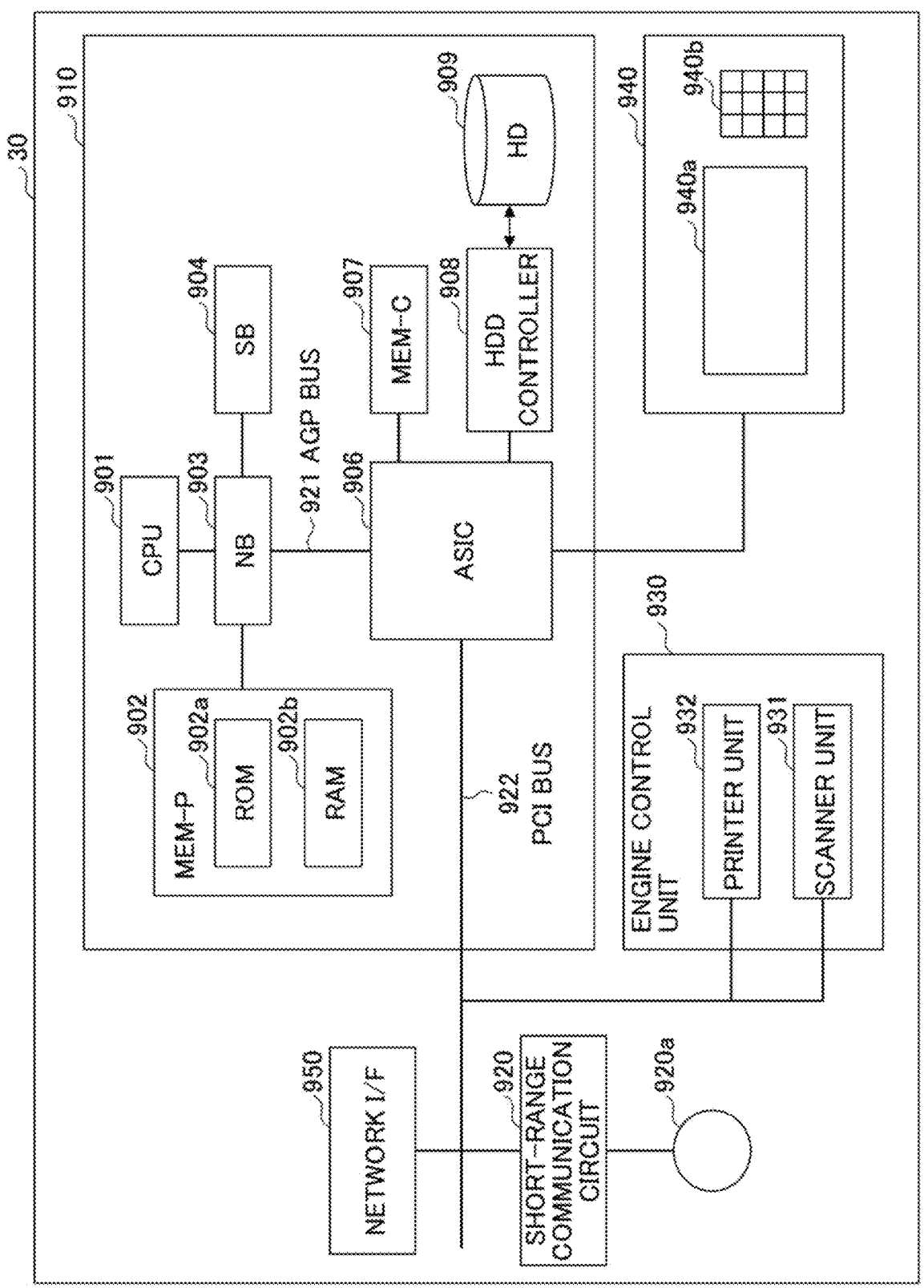
FIG. 5 is an example of a hardware configuration diagram of an output device.

FIG. 5 is a hardware configuration diagram of the output device 30. In FIG. 5, an image forming apparatus is assumed as the output device 30. As illustrated in FIG. 5, the output device 30 includes a controller 910, a short-range communication circuit 920, an engine control unit 930, an operation panel 940, and a network I/F 950.

The controller 910 includes a CPU 901 which is a main part of the computer, a system memory (MEM-P) 902, a north bridge (NB) 903, a south bridge (SB) 904, an Application Specific Integrated Circuit (ASIC) 906, a local memory (MEM-C) 907 which is a storage, an HDD controller 908, and an HD 909 which is a storage. The controller has a configuration in which the NB 903 and the ASIC 906 are connected by an Accelerated Graphics Port (AGP) bus 921.

The CPU 901 is a control unit that controls the entire output device 30. The NB 903 is a bridge for connecting the CPU 901, the MEM-P 902, the SB 904, and the AGP bus 921. The NB 903 includes a memory controller configured to control reading and writing to the MEM-P 902, a Peripheral Component Interconnect (PCI) master, and an AGP target.

The MEM-P 902 includes a ROM 902*a* which is a memory for storing a program and data for implementing each function of the controller 910 and a RAM 902*b* used as video memory for developing a program and data, and for memory printing. The program stored in the RAM 902*b* may be configured to be recorded and provided on a computer-readable recording medium such as a CD-ROM, CD-R, or DVD in an installable format or executable format file.

The SB 904 is a bridge for connecting the NB 903 to a PCI device and a peripheral device. The ASIC 906 is an Integrated Circuit (IC) for image processing including a hardware element for image processing and has a role of a bridge connecting each of the AGP bus 921, a PCI bus 922, the HDD controller 908, and the MEM-C 907. The ASIC 906 includes a PCI target and an AGP master, an arbiter (ARB) which is the core of the ASIC 906, a memory controller configured to control the MEM-C 907, multiple Direct Memory Access Controllers (DMACs) configured to perform such as rotating image data by a hardware logic, and a PCI unit configured to transfer data between a scanner unit 931 and a printer unit 932 via the PCI bus 922. A Universal Serial Bus (USB) interface or an Institute of Electrical and Electronics Engineers 1394 (IEEE 1394) interface may be connected to the ASIC 906.

The MEM-C 907 is a local memory used as a copy image buffer and a code buffer. The HD 909 is storage configured to accumulate image data, to accumulate font data used at the time of printing, and to accumulate forms. The HD 909 controls the reading or writing of data to the HD 909 according to the control of the CPU 901. The AGP bus 921 is a bus interface for a graphics accelerator card proposed for speeding up graphic processing and is capable of speeding up the graphics accelerator card by directly accessing the MEM-P 902 with high throughput.

Further, the short-range communication circuit 920 is provided with an antenna 920*a* of the short-range communication circuit 920. The short-range communication circuit 920 is a communication circuit such as NFC or Bluetooth (registered trademark).

Further, the engine control unit 930 includes the scanner unit 931 and the printer unit 932. Further, the operation panel 940 includes a display unit 940*a* and a hard key 940*b*. The display unit 940*a* is such as a touch panel that displays such as a current setting value or selection screen to accept an input from an operator. The hard key 940*b* includes a numeric keypad for accepting the setting value of a condition related to image formation such as a density setting condition and a start key for accepting an instruction of copy start. The controller 910 performs control of the entire output device 30, and controls, for example, drawing, communication, input from the operation panel 940, and the like. The scanner unit 931 or the printer unit 932 includes an image processing unit such as for error diffusion and gamma conversion.

The output device 30 can select a document box function, a copy function, a printer function, and a facsimile function sequentially through an application switching key on the operation panel 940. When the document box function is selected, the output device 30 becomes in a document box mode. When the copy function is selected, the output device 30 becomes in a copy mode. When the printer function is selected, the output device 30 becomes in a printer mode. When the facsimile function is selected, the output device 30 becomes in a facsimile mode.

Further, the network I/F 950 is an interface for performing data communication using the network N3. The short-range communication circuit 920 and the network I/F 950 are electrically connected to the ASIC 906 via the PCI bus 922.

<Functions of Information Processing System>

Figure 6:
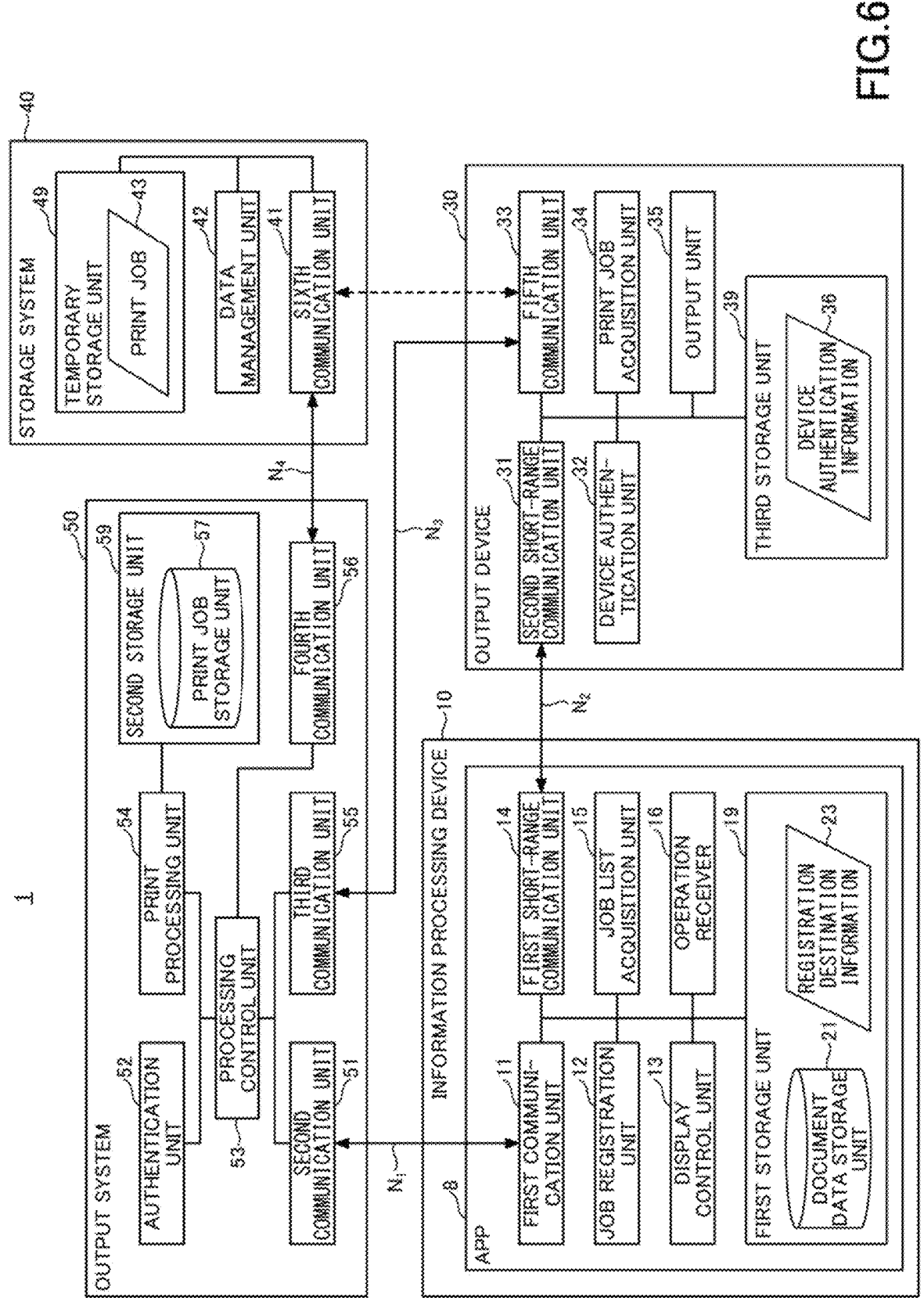
FIG. 6 is an example of a functional block diagram for explaining functions of the information processing device, the output system, the output device, and a storage system of the information processing system by dividing them into blocks.

Subsequently, functions provided by the information processing system 1 will be described with reference to FIG. 6. FIG. 6 is an example of a functional block diagram for explaining functions of the information processing device 10, the output system 50, the output device 30, and a storage system 40 of the information processing system 1. In FIG. 6, the information processing device 10 also serves as a function of the terminal device 9 (registration of the print job).

<Functions of Information Processing Device>

The information processing device 10 includes a first communication unit 11, a job registration unit 12, a display control unit 13, a first short-range communication unit 14, a job list acquisition unit 15, and an operation receiver 16. Each of these functional units included in the information processing device 10 is a function or a unit implemented by an operation, of any one of the configurations illustrated in FIG. 3, according to an instruction from the CPU 401 according to a program (app or Web browser) deployed on the RAM 403 from the EEPROM 404. In FIG. 6, the function implemented by an app 8 is illustrated.

The first communication unit 11 connects to the network N1 to communicate with the output system 50 using registration destination information 23 stored in a first storage unit 19. The registration destination information 23 is information indicating the registration destination of the print job. Details will be described in FIG. 14. As described above, the first communication unit 11 connects to the public line (3G/4G/LTE, etc.), the wireless LAN, or the like, and transmits the print job to the output system 50. The transmission is not limited to wireless, and may be transmitted via the wired LAN or the like. Further, the first communication unit 11 receives a list of print jobs from the output system 50.

The job registration unit 12 transmits the document data to the output system 50 as the print job for the output device 30 for printing. Assuming that the print job includes the document data+print settings, the job registration unit 12 transmits the print settings set by the user or the default print settings together with the document data. However, in the present embodiment, although the information processing device 10 refers to the print job at the stage of transmitting the information to the output system 50, this is for ease of explanation. The information processing device 10 may simply transmit only the document data as the print job to the output system 50. In this case, the user sets the print settings on the information processing device 10 or the output device 30 at the time of printing, or the default print settings are used.

The job list acquisition unit 15 acquires the list of print jobs associated with the user ID via the first communication unit 11.

Figure 10:
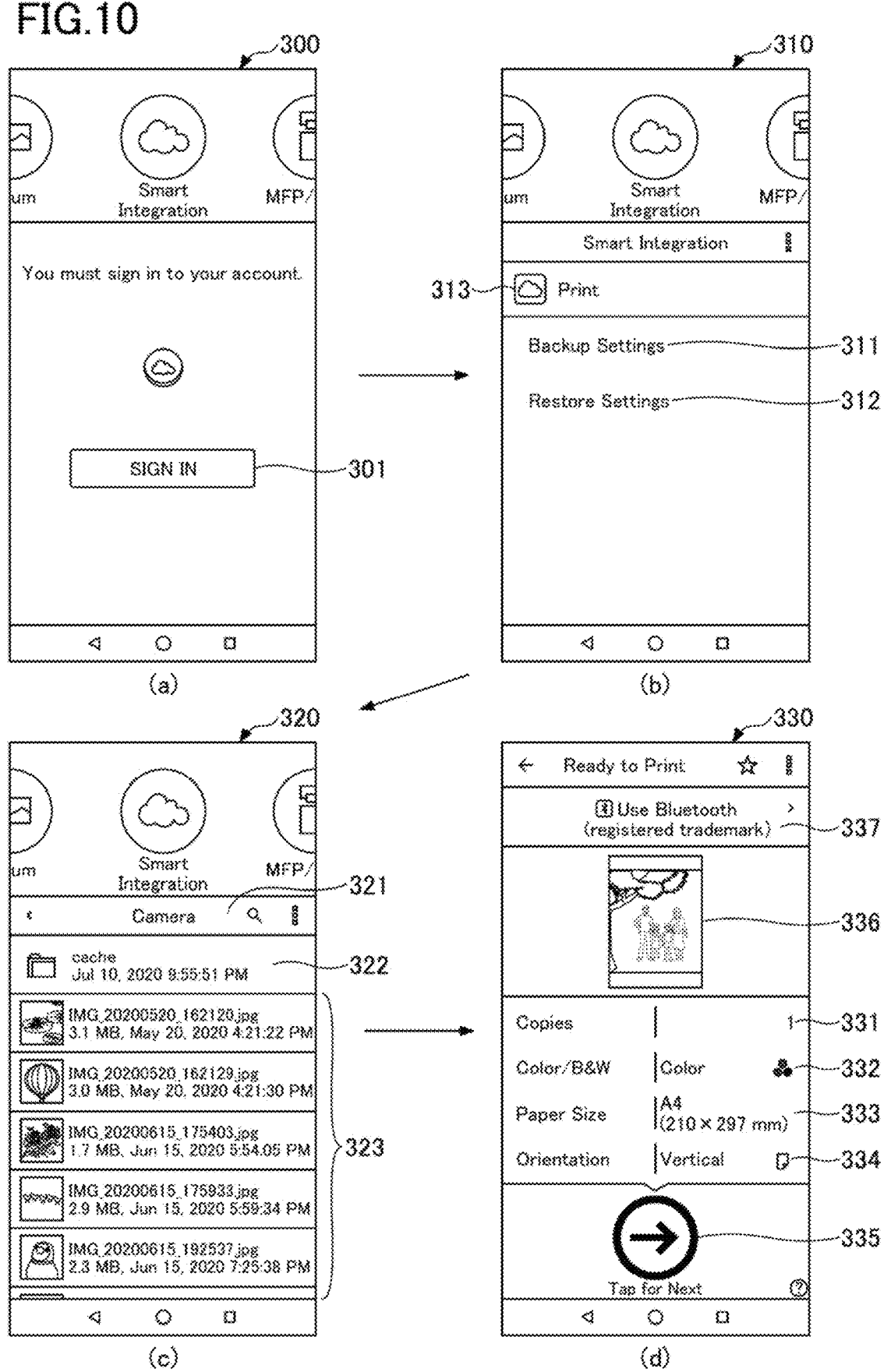
FIG. 10 is a diagram illustrating a transition example of a screen displayed by the information processing device.

The display control unit 13 generates a screen to be a user interface (UI) to display on the display 418. A screen example is illustrated in FIG. 10. When the information processing device 10 executes the app, the information acquired from the output system 50 is arranged in a predetermined layout unit to generate a screen. When the information processing device 10 executes the Web browser, the screen information transmitted from the output system 50 is analyzed to be displayed on the display 418.

The operation receiver 16 receives various operations on the information processing device 10. For example, the operation receiver 16 receives from the user instructions such as selection of the document data to be registered as the print job, batch printing, selection of the print job to be executed, and start of communication with the output device 30.

The first short-range communication unit 14 communicates with the output device 30 by short-range radio (NFC/Bluetooth (registered trademark)/Bluetooth Low Energy (registered trademark), infrared communication, visible light communication, etc.). The user may read a bar code such as a QR code (registered trademark) or a two-dimensional bar code to the information processing device 10, and the first communication unit 11 may transmit information to the output device 30 by TCP/IP.

Further, the information processing device 10 includes the first storage unit 19 consisting of one or more of the EEPROM 404, the RAM 403, or the ROM 402 illustrated in FIG. 3. A document data storage unit 21 is provided in the first storage unit 19, and the registration destination information 23 is stored in the first storage unit 19. The document data storage unit 21 stores document data generated by the user, document data acquired from the Internet, or the like. The document data storage unit 21 may be on the network.

The document data selected by the user is registered in the output system 50 as the print job.

The registration destination information 23 will be described with reference to FIG. 14.

FIG. 14 schematically illustrates an example of the registration destination information 23. The registration destination information 23 is information including the registration destination of the print job. The registration destination information 23 includes, as an example, an output system ID, a URL, a user name, and a password. The output system ID is information for identifying the output system 50, and may be said to be information for uniquely identifying the output system 50. The ID is a combination of a name, a code, a character string, a numerical value, or the like used to uniquely distinguish a specific target from multiple targets. The ID may be referred to as identification information.

The URL is information indicating a location and communication method of resources such as a file and a service that can be accessed on the network. The URL may include address information indicating the location of the resource. In the present embodiment, the address of the output system 50 is included. The user name and password are login information for the user to log in to the output system 50.

<<Functions of Output System>>

Next, a function of the output system 50 will be described. The output system 50 includes a second communication unit 51, an authentication unit 52, a processing control unit 53, a print processing unit 54, a third communication unit 55, and a fourth communication unit 56. Each of these functional units included in the output system 50 is a function or a unit implemented by an operation, of any one of the configurations illustrated in FIG. 4, according to an instruction from the CPU 501 according to a program deployed on the RAM 503 from the HD 504.

The second communication unit 51 connects to the network N1 and transmits/receives various data to/from the information processing device 10. In the present embodiment, the second communication unit 51 mainly receives a document from the information processing device 10 and transmits the list of print jobs to the information processing device 10. Since the output system 50 is provided in a data center or the like, the second communication unit 51 is connected to such as a high-speed LAN. Therefore, the second communication unit 51 is not directly connected to the public line and communicates with the information processing device 10 via a gateway of a telephone company.

The third communication unit 55 connects to the network N3 and transmits/receives various data to/from the output device 30. In the present embodiment, the third communication unit 55 mainly receives the signature URL from the output device 30 and transmits the print job to the output system 50. The print job may be directly transmitted to the output device 30 by the storage system 40.

The fourth communication unit 56 connects to the network N4 and transmits/receives various data to/from the storage system 40. In the present embodiment, the fourth communication unit 56 mainly transmits the print job to the storage system 40 and receives the signature URL from the storage system 40. Further, when the output system 50 transmits the print job to the output device 30 (when the output device 30 and the storage system 40 do not directly communicate with each other), the fourth communication unit 56 receives the print job from the storage system 40.

The processing control unit 53 controls the execution of the app in response to the request from the user. When the user requests the information processing device 10 for pull printing, the user executes an app corresponding to pull printing. The processing control unit 53 performs a series of controls on the app (pull printing) requested to be executed. Therefore, the processing control unit 53 controls the overall flow of processing according to the app selected by the user. Further, when the app includes multiple processes, the app may be called a workflow (series of processes). The processing control unit 53 executes a series of processes in an order of the determined processes.

The print processing unit 54 converts the document received from the information processing device 10 into printable print data to store in the print job storage unit 57. Further, the print processing unit 54 returns the print job based on the request from the output device 30. Regarding the print processing, the second communication unit 51 includes a function of communicating with the information processing device 10, a function of communicating with the Web browser, and a function of receiving an e-mail. Further, the third communication unit 55 includes a function of a port monitor (a module for transmitting the output of the printer driver).

The authentication unit 52 performs such as a user authentication or an authorization of authority. The authentication means determines whether the user is a legitimate authorized person. In the present embodiment, the authentication means whether the user has a permission to use the output system 50. The authorization of authority is to give the user the authority of operations that the user can perform (display, print, edit, or the like of the print job). If the authentication is successful, the user logs in to the output system 50. The login is an authentication act to access system resources using pre-registered account information when using various services on a computer or the Internet. The account information includes the user ID and password, an IC card number, the biometric authentication information, and the like. The authentication unit 52 also manages a tenant.

Further, the output system 50 includes a second storage unit 59 consisting of one or more of the HD 504, the RAM 503, and the ROM 502 illustrated in FIG. 4. The print job storage unit 57 is provided in the second storage unit 59. FIG. 15 illustrates the information stored in the print job storage unit 57.

Table 2 schematically illustrates the print job information stored in the print job storage unit 57. Each item such as a document ID, a tenant ID, a user ID, a document name, a print data path, and the number of pages is registered in the print job information. The document ID is identification information for identifying the print job (an example of third identification information). One print job in FIG. 15 corresponds to one document. The tenant ID is identification information that identifies the tenant. The tenant means information indicating a customer who shares the same software among multiple customers, that is, a company or the like which is a group of customers. Each user in the tenant can use the app contracted by the tenant, and the tenant administrator of the tenant can give the user the authority to use multiple software instances (an app or a package of multiple apps) provided in the system. The tenant ID in FIG. 15 is the tenant to which the user belongs. The user ID is identification information of the user who registered the print job. The document name is a file name of the document. The print data path indicates a location (URL on the network) where the document data is stored. The print data path may be a file path, or the document data may be stored in the print job storage unit 57. The number of pages is the number of pages of the document.

<<Functions of Output Device>>

Next, a function of the output device 30 will be described. The output device 30 includes a second short-range communication unit 31, a device authentication unit 32, a fifth communication unit 33, a print job acquisition unit 34, and an output unit 35. Each of these functional units included in the output device 30 is a function or a unit implemented by an operation, of any one of the configurations illustrated in FIG. 5, according to an instruction from the CPU 901 according to a program deployed on the RAM 902$b$ from the HD 905.

The second short-range communication unit 31 connects to the network N2 to communicate with the information processing device 10 by short-range radio (NFC/Bluetooth (registered trademark)/Bluetooth Low Energy (registered trademark), etc.). The second short-range communication unit 31 periodically transmits radio waves indicating existence of the second short-range communication unit 31 to the surroundings. Reaching the range of the radio wave, the information processing device 10 detects the radio wave to automatically start communication between the first short-range communication unit 14 and the second short-range communication unit 31 of the information processing device 10. In the present embodiment, the second short-range communication unit 31 receives the signature URL from the information processing device 10.

The device authentication unit 32 cooperates with the output system 50 regarding authentication by transmitting an authentication request to the output system 50. The output system 50 performs actual authentication.

The fifth communication unit 33 transmits/receives various data to/from the output system 50 via the network N3. In the present embodiment, the fifth communication unit 33 transmits the signature URL and receives the print job. The fifth communication unit 33 may directly communicate with the storage system 40 to transmit the signature URL and to receive the print job associated with the signature URL from the storage system 40.

The print job acquisition unit 34 transmits the signature URL to the output system 50 or the storage system 40 via the fifth communication unit 33 and acquires the print job associated with the signature URL from the output system 50 or the storage system 40.

The output unit 35 is an original printing function of the output device 30. The output unit 35 prints the document data on a sheet material such as paper by executing the print job acquired by the print job acquisition unit 34. Printing may be referred to as output.

Further, the output device 30 includes a third storage unit 39 provided in at least one of the HD 905 or the RAM 902$b$. The third storage unit 39 stores the device authentication information 36. The device authentication information 36 is information indicating that the output device 30 is located in the tenant and has been authenticated. The device authentication information 36 is stored in the third storage unit 39 when the tenant administrator or the like operates the output device 30 to input the authentication information distributed by the seller and the output system 50 determines that the authentication is successful. Therefore, even if the user can log in to the output system 50, printing cannot be performed from the output device 30 without the device authentication information 36.

<<Storage System>>

Next, a function of the storage system 40 will be described. The storage system 40 includes a sixth communication unit 41 and a data management unit 42. Each of these functional units included in the storage system 40 is a function or a unit implemented by an operation, of any one of the configurations illustrated in FIG. 4, according to an instruction from the CPU 501 according to a program deployed on the RAM 503 from the HD 504.

The sixth communication unit 41 connects to the network N4 and transmits/receives various data to/from the output system 50. In the present embodiment, the sixth communication unit 41 receives the print job from the output system 50. When the output device 30 communicates with the output system 50, the sixth communication unit 41 receives the signature URL and transmits the print job to the output system 50. When the output device 30 directly communicates with the storage system 40, the sixth communication unit 41 receives the signature URL and transmits the print job to the output device 30.

The data management unit 42 stores the print job in a temporary storage unit 49, and also issues the signature URL of the stored print job. Further, when the print job is requested, the data management unit 42 determines whether to provide the print job associated with the signature URL from the temporary storage unit 49 based on the restrictions set in the signature URL. The restrictions set for the signature URL will be described later.

Further, the storage system 40 includes the temporary storage unit 49 consisting of one or more of the HD 504, the RAM 503, and the ROM 502 illustrated in FIG. 4. The print job 43 transferred from the print job storage unit 57 is temporarily stored in the temporary storage unit 49. Temporary means that the print job 43 is deleted due to completion of provision or execution of the print job 43. The temporary storage unit 49 is a storage destination that does not require authentication and can be accessed by any user.

<Signature URL>

Next, the signature URL will be described with reference to FIG. 7. The signature URL is a URL that includes an expiration date or additional information such as an accessible user (IP address). The signature URL is also referred to as a signed URL. Using the signature URL to control an access by the user's account is not desirable, but rather, the signature URL is used when controlling the access using an application-specific logic is desired. If the signature URL has an expiration date, anyone who knows the URL can access the resource until the signature URL expires. However, even if the storage system 40 does not require authentication, access to the print job is restricted by a time limit or the like.

FIG. 7A is a description example in the case of the signature URL including restriction information. The restriction information in FIG. 7A is the time limit. Query parameters can be set in the URL, and the restriction information is set in these query parameters. The query parameter is a character string parameter being added to the end of the URL and starts with "? (Question mark)" or "&." In FIG. 7A, "Expires=1111111111" indicates the time limit for the user to access. "Expires=1111111111" indicates the date and time in the format of, for example, YYMMDDhhmm.

Further, "Signature=MIIC4TCCAckCAQAwbDEQMA4GA1UE BhMHVW5rbm93bjEQMA4GA1UEC BMHVW5rbm93bjEQMA4GA1UEBxMHVW5rbm93bjE QMA4GA1UEChMHVW5rbm93bjEQM A4GA1UECxMHVW5rbm93bjEQMA4GA1UEAxMHV W5rbm93bjCCASIwDQYJKoZIhvcNA QEBBQADggE-PADCCAQoCggEBAL/x4IdX8m4wmV+b74S/ nTMgr3qwPU6fni+1S/H+J bEqe" is a hashed and signed base64 encoded version of a JSON policy statement. Since this URL is associated with the storage destination, this URL is information indicating the storage destination.

Further, "&Key-Pair-Id=XXXXXXXXXXXXX XXXXXXX" is a public key used for verification of the signed URL. The public key is used by the storage system 40 to compare the information in the signature with the information in an original policy statement to verify that the URL has not been tampered with.

As illustrated in FIG. 7B, the restriction information, the URL, and the file path may be associated with each other in the shape of the table. FIG. 7B illustrates a restriction information table included in the storage system 40 or the output system 50. The restriction information table is managed by the storage system 40 or the output system 50, and includes each item of ID, time limit, file path, and user restriction. Each item is determined when the print job is registered in the storage system 40. The ID is identification information included in the signature URL. The time limit is the expiration date that the user can access. The file path indicates the storage destination of the print job. The user restriction is set whether to authenticate the user.

The signature URL including the ID is issued as illustrated in FIG. 7B. When the registration of the print job is requested, the data management unit 42 of the storage system generates the ID and determines the time limit. Then, the file path is determined based on a print job folder saved in the temporary storage unit 49. The user restriction is predetermined.

Taking the ID in the first row of the restriction information table as an example, the signature URL is "https://www.hostname.com/files/253902AD9CE94EDE908F36336510FECD." When an access is requested based on the signature URL, the data management unit 42 of the storage system 40 returns the file (the print job) of the file path, if the user accesses within the time limit associated with "253902AD9CE94EDE908F36336510FECD" in the restriction information table. In this case, if the user restriction is "Yes", an error will occur if no authentication information exists, and if the user restriction is "No", the data management unit 42 returns the file even if no authentication information exists.

<Operation Procedure>

Figure 8:
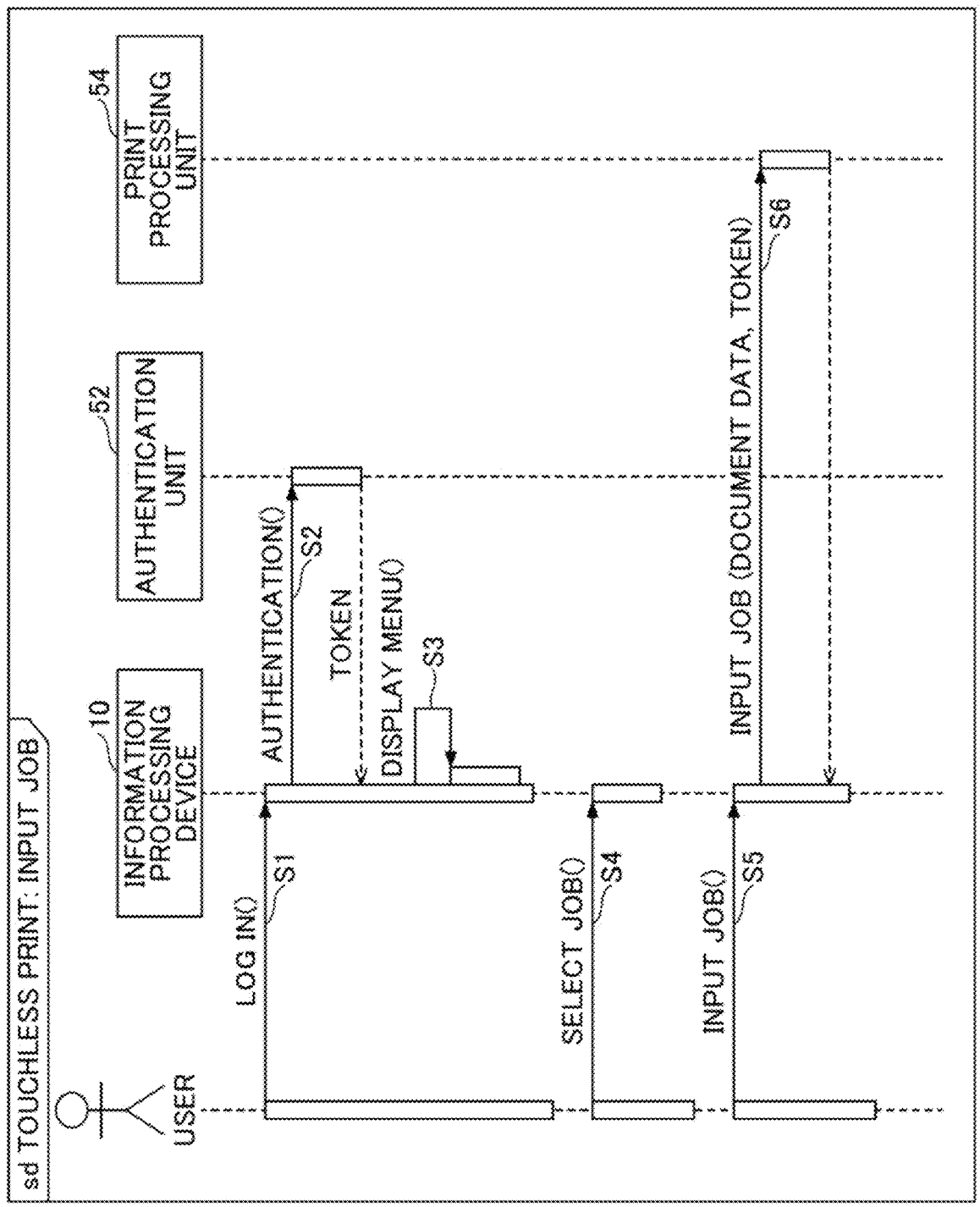
FIG. 8 is an example of a sequence diagram illustrating a process of registering a document in the output system with the information processing device operated by a user.

Subsequently, with reference to FIG. 8, a flow in which the user registers the print job in the output system 50 will be described. FIG. 8 is an example of a sequence diagram illustrating a process of registering a document in the output system 50 by the information processing device 10 operated by the user. The user registers the document to be printed later or as of the current time by the output device 30 in the output system 50.

S1: The user performs an operation for logging in to the output system 50 in the app 8 running in the information processing device 10 (input or transmission instruction of authentication information). The user may use a Web browser instead of the app 8. The port monitor is used to submit jobs from the Web browser. The port monitor is a module that transmits data created by the printer driver. The printer driver includes a function of transmitting the authentication information. Further, e-mail may be used to register the print job. An example of a login screen is illustrated in FIG. 10(a).

S2: The first communication unit 11 of the information processing device 10 transmits the authentication information to the output system 50 to request login. The second communication unit 51 of the output system 50 receives the authentication information, and the authentication unit 52 authenticates. The authentication information includes the tenant ID, the user ID, the password, and the like. The authentication information may be an e-mail address and a password. Further, the login may be a login linked with an external service using the e-mail address (single sign-on).

If the authentication is successful, the authentication unit 52 generates a token, and the second communication unit 51 returns the token to the information processing device 10. The information processing device 10 stores the token in the first storage unit 19. Since the output system 50 stores the token in association with the user, the user is identified by the token. While the token is valid, the information processing device 10 can communicate with the output system using the token instead of the authentication information.

S3: If the login to the output system 50 is successful, the display control unit 13 of the information processing device 10 displays a menu screen of the app.

S4: The user presses a button or the like for registering the print job on the menu screen to select a document (file) to be registered in the output system 50. The operation receiver 16 of the information processing device 10 accepts the above operation.

S5: When the user inputs an operation for transmitting the document, the operation receiver 16 of the information processing device 10 accepts the operation.

S6: The first communication unit 11 of the information processing device 10 inputs the token and the selected document into the output system 50 as the print job.

With the above processing, the print job is registered in the print job storage unit 57. Since the app holds the token, the user is only required to perform the processing of FIG. 8 once.

Note that the operation of the user transmitting the document may be an execution request of the print job described with reference to FIG. 8.

<<Pull Printing Processing>>

Figure 9A:
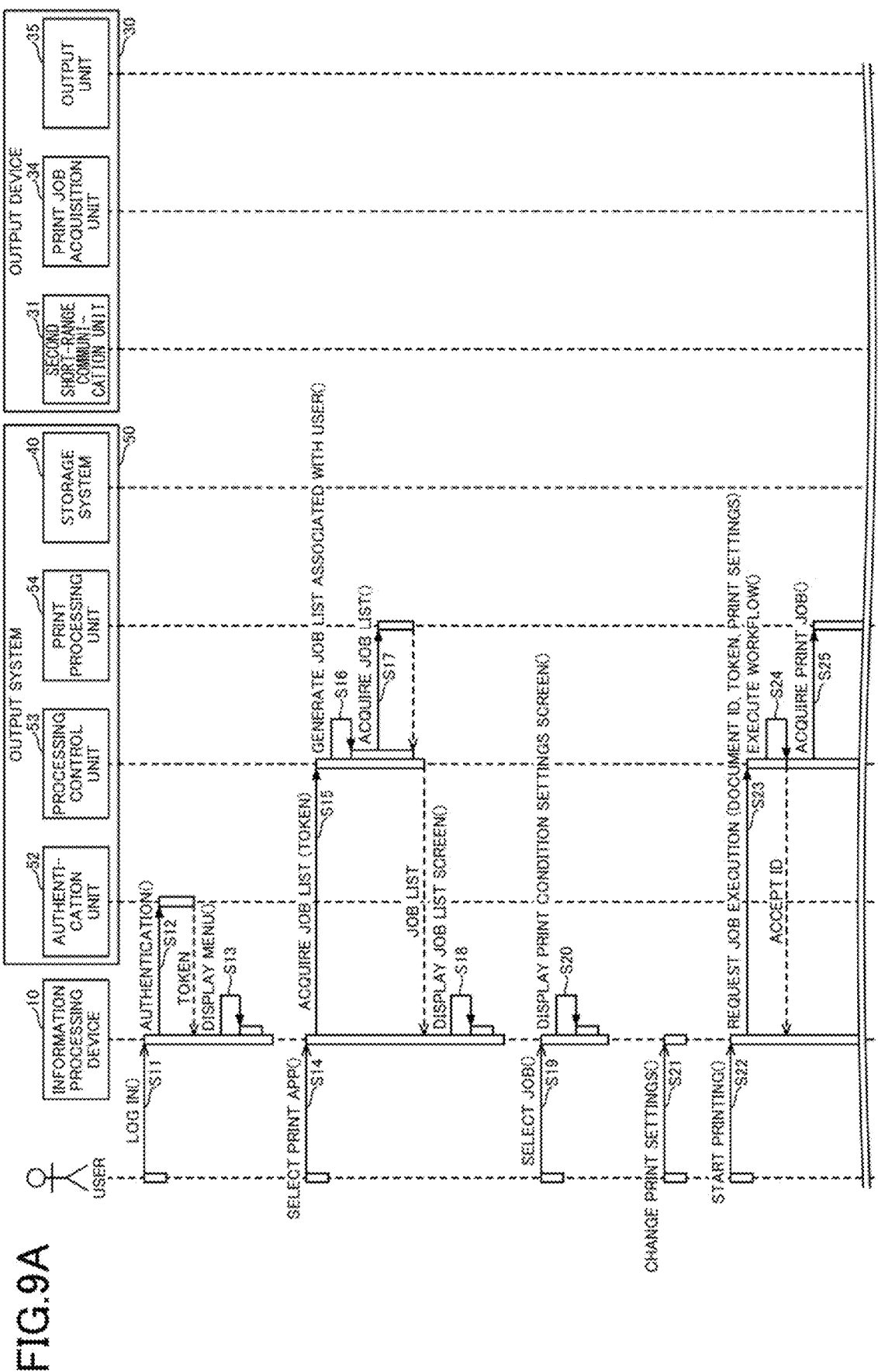
FIG. 9A is an example of a sequence diagram illustrating a procedure for the user to print a print job (document) registered in the output system from the output device (No. 1)
Figure 9B:
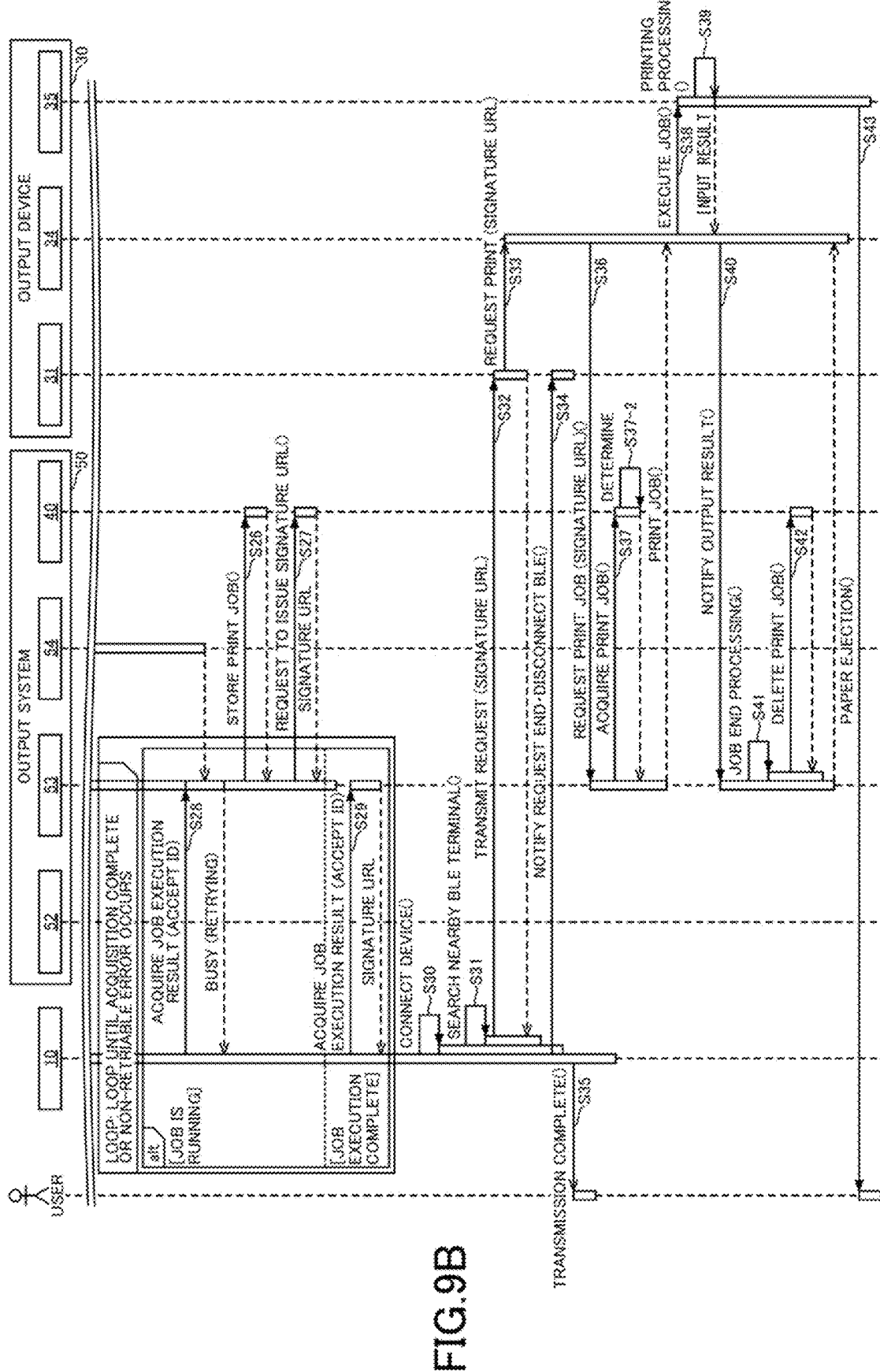
FIG. 9B is an example of a sequence diagram illustrating a procedure for the user to print the print job (document) registered in the output system from the output device (No. 2)

Subsequently, a flow of the pull printing of the present embodiment will be described with reference to FIG. 9A and FIG. 9B. FIG. 9A and FIG. 9B are examples of sequence diagrams illustrating a procedure for the user to print the print job (document) registered in the output system 50 from the output device 30. When the user desires to print a document by the output device 30, the user operates the information processing device 10 to start printing. The user can print without being involved in the output device 30.

S11 to S13: Same as steps S1 to S3 in FIG. 8. If the user has already performed steps S1 to S3 (within the valid period of the token), steps S11 to S13 are unnecessary.

S14: The user inputs the operation to print the print job from the menu screen. For example, the user operates a predetermined icon. The operation receiver 16 of the information processing device 10 accepts the operation. An example of the menu screen is illustrated in FIG. 10(*b*).

S15: The first communication unit 11 of the information processing device 10 requests the output system 50 to acquire the job list. At the time of request, the token acquired by the information processing device 10 upon successful authentication is used. Therefore, the print job associated with the user ID is specified in the output system 50. The print job is printed by executing the workflow. Various apps are prepared in the workflow, one of which is the pull printing app. Therefore, the user selects the workflow app (print the print job).

S16: The second communication unit 51 of the output system 50 receives the job list acquisition request. The processing control unit 53 starts executing the requested workflow app.

S17: Therefore, the processing control unit 53 requests the print processing unit 54 to acquire the job list associated with the user ID of the logged-in user. The print processing unit 54 acquires the list of print jobs associated with the user ID from the print job storage unit 57 to return to the processing control unit 53. Note that authentication is not particularly required if the processing control unit 53 and the print processing unit 54 are in the same cloud service, but authentication may be performed when the print processing unit 54 is the external service.

The processing control unit 53 transmits the list of print jobs to the information processing device 10 via the second communication unit 51. The list of print jobs includes a part of or all of the information illustrated in FIG. 15.

S18: The first communication unit 11 of the information processing device 10 receives the list of print jobs, and the display control unit 13 displays a job list screen on the display 418. An example of the job list screen is illustrated in FIG. 10(*c*).

S19: The user selects one or more print jobs to print from the job list screen. The operation receiver 16 accepts the selection.

S20: The display control unit 13 of the information processing device 10 displays a print condition settings screen. An example of the print condition settings screen is illustrated in FIG. 10(*d*).

S21: The user inputs any print settings on the print condition settings screen. When the user selects multiple print jobs, the same print settings may be set for each print job, or the print settings may be set individually for each print job.

S22: The user inputs the print start to the information processing device 10 by pressing a communication start button. The operation receiver 16 accepts the input.

S23: The first communication unit 11 of the information processing device 10 designates the token, the print conditions, and the document ID of the selected print job, and requests the output system 50 to execute printing. More specifically, the first communication unit 11 requests the output system 50 to execute the workflow app that prints the print job. However, in the case of a simple print service, the first communication unit 11 may simply request file acquisition.

S24: The second communication unit 51 of the output system 50 receives the execution request of the print job, and the processing control unit 53 starts the workflow. That is, the processing control unit 53 starts executing the designated print job under the designated print conditions. Executing of the print job in the output system 50 is to save the print job in the storage system 40. Further, the output system 50 and the information processing device 10 operate asynchronously. The processing control unit 53 returns a reception ID for the accepted print job.

S25: The processing control unit 53 acquires the print job associated with the document ID from the print processing unit 54 based on a workflow definition. The workflow definition defines what kind of processing is performed by the output system 50 and the order in which the processing is performed.

S26: The processing control unit 53 stores the print job acquired from the print processing unit 54 in the storage system 40 based on the workflow definition. The print job is stored in the temporary storage unit 49 of the storage system 40.

S27: The processing control unit 53 requests the storage system 40 to issue the signature URL indicating the storage destination of the print job based on the workflow definition. That is, the processing control unit 53 acquires the signature URL (an example of the fourth identification information) issued with respect to the output request for the print job in response to receiving the identification information of the print job. In the case of the signature URL as illustrated in FIG. 7A, the data management unit 42 determines the time limit (Expires) and generates the signature (Signature). The data management unit 42 generates the signature URL by attaching the time limit, the signature, and a public key (Key-Pair-Id) as query parameters to the URL of the temporary storage unit 49. The time limit for the user to access is predetermined. The time limit is, for example, a fixed time from the time when the signature URL is issued. Since the policy statement which is the basis of the signature is predetermined, the data management unit 42 encrypts a hash value with the public key to create the signature.

The public key (Key-Pair-Id) is generated as a pair with a private key or is predetermined.

The data management unit 42 of the storage system 40 associates the print job stored in the temporary storage unit 49 of the storage system 40 with the signature URL. The fourth communication unit 56 receives the signature URL from the storage system 40.

Further, when the restriction information is stored in the restriction information table as illustrated in FIG. 7B, the data management unit 42 assigns the ID and associates the time limit, the file path, and the user restriction to register in the restriction information table. The time limit may be the same as in FIG. 7A. The file path is determined by the actual storage destination, and the user restriction is predetermined (in the present embodiment, there is no user restriction). The data management unit 42 combines the URL of the temporary storage unit 49 with the ID to generate the signature URL.

Since the storage system 40 creates a unique signature URL, when the information processing device 10 requests executing of the print job, the processing control unit 53 acquires a different signature URL for each output request even if the output is requested for the same print job.

S28: On the other hand, the first communication unit of the information processing device 10 designates the receiving ID and requests the output system 50 for the execution result of the print job. Since the information processing device 10 and the output system 50 operate asynchronously, a busy signal (in execution) is returned until the saving of the print job is completed. Therefore, the first communication unit 11 of the information processing device 10 repeatedly requests the output system 50 for the execution result of the print job (polling).

S29: When the saving of the print job is completed (when the signature URL is generated), the second communication unit 51 of the output system 50 transmits the signature URL. The first communication unit 11 of the information processing device 10 receives the execution result of the print job (the signature URL). The first communication unit 11 of the information processing device 10 preferably confirms a format of the signature URL or at least data of the URL format has been acquired. As a result, when the information processing device 10 confirms that the information processing device 10 has been received the URL that the output device 30 can access, the short-range wireless communication can be started.

S30: When the signature URL is received, this is taken as an opportunity by the first short-range communication unit 14 to start the connection with the output device 30. In the present embodiment, the first short-range communication unit 14 communicates using Bluetooth Low Energy (registered trademark), but other connection methods (such as TCP/IP, IP address acquired from QR code (registered trademark) or the like) may be used. The connection may be started automatically when the signature URL is received, or may be started by the user's operation.

S31: The first short-range communication unit 14 searches for a nearby communicable output device 30. Nearby means that intensity of radio wave is equal to or greater than a threshold value. In the case of Bluetooth Low Energy (registered trademark), pairing (exchange of keys for data encryption between central and peripheral) is not required depending on the design, and connection can be made between each other when radio waves reach each other. In the case of general Bluetooth (registered trademark), both are assumed to already have been paired.

S32: The first short-range communication unit 14 of the information processing device 10 transmits a print request to the found output device 30 with the signature URL being designated.

S33: The second short-range communication unit 31 of the output device 30 receives the print request with the signature URL. The second short-range communication unit 31 requests the print job acquisition unit 34 to print the print job designated by the signature URL.

S34: Since the first short-range communication unit 14 of the information processing device 10 has transmitted the signature URL, the communication is disconnected.

S35: The display control unit 13 of the information processing device 10 displays on the display 418 that the transmission is completed.

S36: The print job acquisition unit 34 of the output device 30 designates the signature URL for the output system 50 to acquire the print job. Since the signature URL is known, the print job acquisition unit 34 may acquire the print job directly from the storage system 40. Further, in the present embodiment, the print job acquisition unit 34 acquires the print job, but the output unit 35 (printer app) may acquire the print job in the case of having a pull printing function.

S37: The third communication unit 55 of the output system 50 receives the acquisition request of the print job designated by the signature URL, and the processing control unit 53 acquires the print job specified by the signature URL from the storage system 40 via the fourth communication unit 56.

S37-2: In the case of the signature URL illustrated in FIG. 7A, in the storage system 40, the data management unit 42 decrypts the signature with the private key to confirm that the signature has not been tampered with. If there is no tampering, the data management unit 42 determines whether the restriction (time limit) included in the signature URL is satisfied. When the restriction is satisfied, the data management unit 42 acquires the print job associated with the signature URL (signature) stored in the temporary storage unit 49.

When the restriction information is managed in the restriction information table of FIG. 7B, the data management unit 42 searches the restriction information table with the ID included in the signature URL, and determines whether the time limit is satisfied if the user restriction is "No". If the user restriction is "Yes", the output device 30 transmits the authentication information, and the authentication unit 52 determines whether the authentication is successful. When the time limit or the like satisfies the restriction, the data management unit 42 acquires the print job specified by the file path from the temporary storage unit 49. The sixth communication unit 41 of the storage system 40 transmits the print job to the output system 50. The third communication unit 55 of the output system 50 transmits the print job to the output device 30.

S38: The fifth communication unit 33 of the output device 30 receives the print job, and causes the output unit 35 to execute the print job.

S39: The output unit 35 performs printing processing of the designated print job. The output unit 35 returns the execution result of the print job to the print job acquisition unit 34.

S40: The print job acquisition unit 34 designates the signature URL to transmit the execution result of the print job (data output result) to the output system 50 via the fifth communication unit 33.

S41: The fourth communication unit 56 of the output system 50 receives the execution result of the print job, and the processing control unit 53 starts the end processing of the print job. The processing control unit 53 describes, for example, a log of the print job.

S42: Further, the processing control unit 53 designates the signature URL to request the storage system 40 to delete the print job. The data management unit 42 of the storage system 40 deletes the print job associated with the signature URL. Since the print job is deleted when the execution of the print job is completed, the risk of the print job being leaked can be reduced even if the storage system 40 can be accessed without authentication. At the time of deletion, the data management unit 42 determines whether the restriction included in the signature URL is satisfied and deletes only when the restriction is satisfied. On the other hand, at the time of deletion, in order to prevent the leakage of the print job, the print job may be forcibly deleted regardless of the restriction. Further, the data management unit 42 may delete the print job immediately after the print job is transmitted to the output device 30, instead of deleting after the execution of the print job.

S43: The output device 30 notifies the user of the completion of paper ejection by e-mail or the like. As a result, the printed matter from being left unattended can be prevented.

<Screen Example>

FIG. 10 illustrates a transition example of a screen displayed by the information processing device. First, FIG. 10(a) illustrates an example of the login screen 300. The login screen 300 includes a login button 301. When the user presses the login button 301, the information processing device 10 displays a screen for displaying the e-mail address and password. When the user inputs the correct e-mail address and password to transmit to the output system 50, the user can log in.

FIG. 10(b) is an example of the menu screen 310 displayed by the information processing device 10 after login. The menu screen 310 includes a backup setting button 311, a restore setting button 312, and a print button 313. The backup setting button 311 is a button for the user to make settings related to the backup of the document file. The restore setting button 312 is a button for the user to make settings related to restoration of the document file (returning from the duplicated data when the document file is lost).

The print button 313 is a button that the user presses to start the pull printing. By pressing the print button 313, the information processing device 10 transmits the token to the output system 50, and the information processing device 10 can receive the list of print jobs associated with the user.

FIG. 10(c) is an example of the job list screen 320 displayed when the print button 313 is pressed. The job list screen 320 displays a search field 321, a folder 322, and a document list 323 stored in the folder 322 by the information processing device 10. The user can select any document file from the document list 323. Although the document is image data in FIG. 10(c), the document may be a file created by various applications.

FIG. 10(d) illustrates an example of the print condition settings screen 330 displayed by the information processing device 10 when the document is selected. The print condition settings screen 330 displays an image 336 of the document selected in FIG. 10(c). Further, the print condition settings screen 330 includes a number of copies field 331, a color/monochrome field 332, a paper size field 333, a print direction field 334, a setting item switching button 335, and a communication start button 337. The number of copies field 331 is a field in which the user sets the number of copies to be printed. The color/monochrome field 332 is a field in which the user sets color printing or monochrome printing. The paper size field 333 is a field in which the user sets the size of the paper. The print direction field 334 is a field in which the user sets the orientation of the paper. The setting item switching button 335 is a button for the user to switch the setting item. The information processing device 10 displays another setting item. The communication start button 337 is a button that causes the information processing device 10 to start communication with the output device 30.

<Main Effect>

As described above, in the present embodiment, since the print job is stored in the storage system 40 that does not require authentication, transmitting the authentication information from the information processing device 10 to the output device 30 is not required. Therefore, there is no risk of the authentication information being leaked. Even if the signature URL is leaked, since any user can access only for the print job for which printing is requested with the signature URL, the leaked information can be minimized. In the first place, since the signature URL can limit the access period and the IP address of the accessing terminal, the risk when the signature URL is leaked can be reduced. Further, the user is not required to be involved in the output device 30 operated by an unspecified number of people. Further, the user is not required to connect the information processing device 10 to the same network as the output device 30.

Embodiment 2

In the present embodiment, an information processing system in which an output device 30 can acquire a user ID by adding the user ID to the print data by an output system 50 will be described. This is effective in the output device 30 that requires the user ID to execute the print job in terms of specifications. Note that even in the present embodiment, authentication information such as a password is not required.

In the present embodiment, the hardware configuration diagrams of FIG. 3 to FIG. 5 and the functional block diagram illustrated in FIG. 6 described in the above embodiment will be described as being applicable.

<Pull Printing Processing>

Figure 11A:
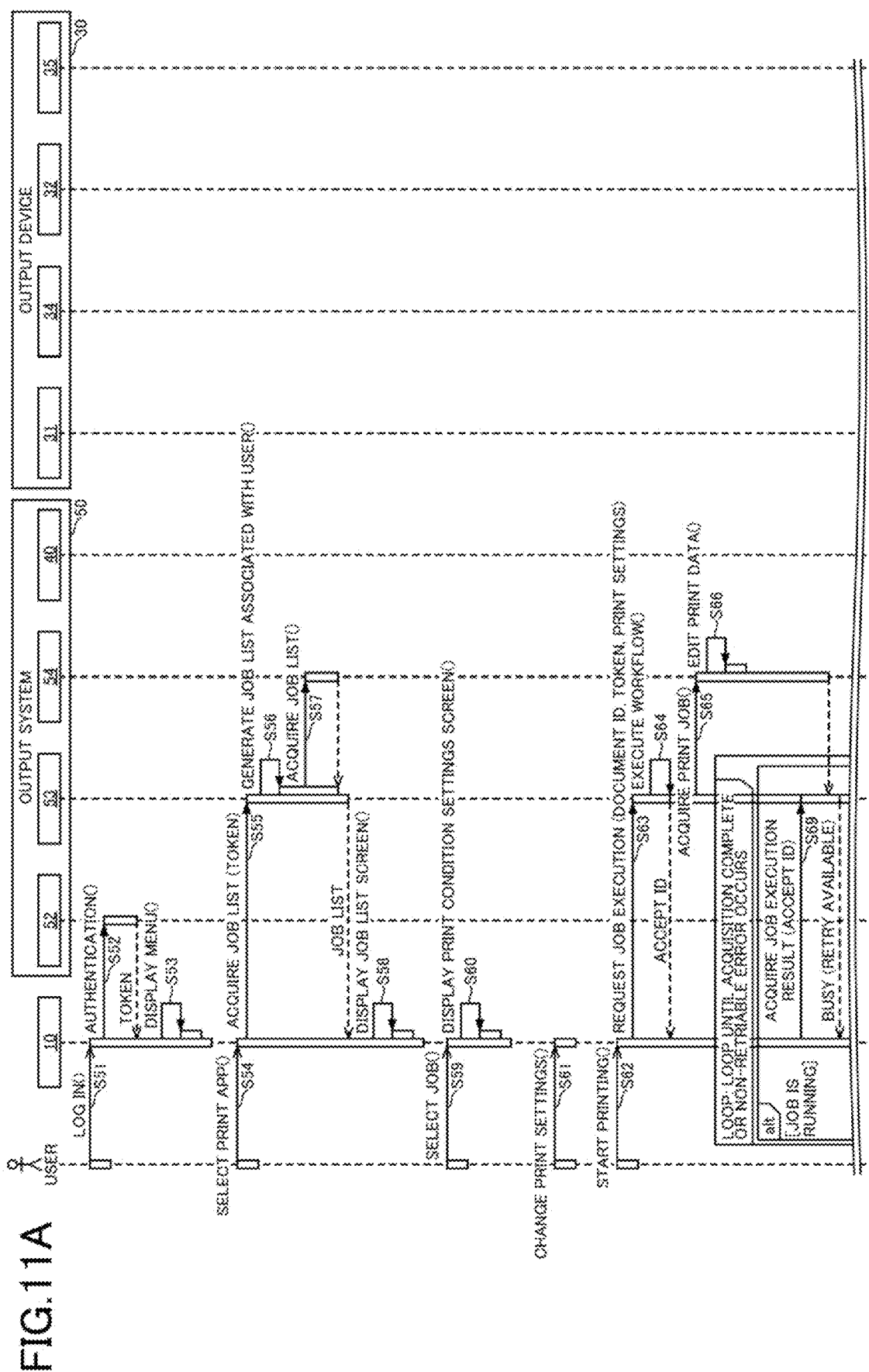
FIG. 11A is an example of a sequence diagram illustrating a procedure for the user to print the print job (document) registered in the output system from the output device when the output device requires a user ID to execute the print job (No. 1)

A flow of the pull printing of the present embodiment will be described with reference to FIG. 11A and FIG. 11B. FIG. 11A and FIG. 11B are examples of sequence diagrams illustrating a procedure for the user to print the print job (document) registered in the output system from the output device when the output device requires the user ID to execute the print job. In the description of FIG. 11, the difference from FIG. 9 will be mainly described. In FIG. 11, steps S66, S73, S74, S84 and subsequent steps are different from those in FIG. 9.

S66: Upon receiving the print job acquisition request, the print processing unit 54 performs editing by embedding the user ID in the print data. That is, when the output device 30 prints, the user ID of the user who executes printing is edited based on a predetermined format of the print data in order to perform printing even if user authentication is required. The predetermined format means following the format of Printer Description Language (PDL). Generally, the format for describing the user ID is defined in the PDL.

S73, S74: The user ID may be transmitted to the output device 30 at the timing when the information processing device 10 transmits the signature URL. The user ID is transmitted from the output system 50 to the information processing device 10 upon successful authentication. Further, the information processing device 10 may transmit the user ID while the user ID is included in the print data.

S84: If user authentication is required for printing, the output unit 35 of the output device 30 that has started executing the print job requests the device authentication unit 32 to confirm the existence of the user by using the user ID included in the print data or the user ID (the user ID specified by successful user authentication) received from the information processing device 10.

S85: The device authentication unit 32 designates the user ID and the device authentication information 36 via the fifth communication unit 33, and requests the output system 50 to authenticate the existence of the user. The third communication unit 55 of the output system 50 receives the existence of the user confirmation request, and the authentication unit 52 performs the existence of the user confirmation. In the present embodiment, if the user exists, the authentication is determined to be successful. That is, the existence of the user is determined based on whether the user ID is registered in the user information held in advance by the authentication unit 52. If the user exists, the third communication unit 55 returns to the output device 30 the fact that the user exists. The fifth communication unit 33 of the output device 30 receives the fact that the user exists, and the device authentication unit 32 converts the fact into authentication success. The device authentication unit 32 transmits the authentication success to the output unit 35. If the device authentication unit 32 acquires the fact that the user does not exist, the device authentication unit 32 converts the fact into authentication failure to transmit to the output unit 35.

S86: If the output unit 35 receives the authentication success, printing continues. If the output unit 35 receives the authentication failure, printing is stopped.

<Main Effect>

According to the information processing system of the present embodiment, in addition to the effect of the Embodiment 1, even if the output device 30 requires user authentication at the time of printing, the authentication can be performed by confirming the existence of the user by the user ID.

Embodiment 3

In the sequence of Embodiment 1 or 2, short-range wireless communication with the output device 30 cannot be performed until the information processing device 10 receives the signature URL. In particular, when the number of print jobs that the user wants to print is large, the waiting time of the user may increase. Therefore, in the present embodiment, the information processing system 1 in which the user is not required to wait until the output system 50 transmits the signature URL to the information processing device 10 will be described.

In the present embodiment, the hardware configuration diagrams of FIG. 3 to FIG. 5 and the functional block diagram illustrated in FIG. 6 described in the above embodiment will be described as being applicable.

<Pull Printing Processing>

Figure 12A:
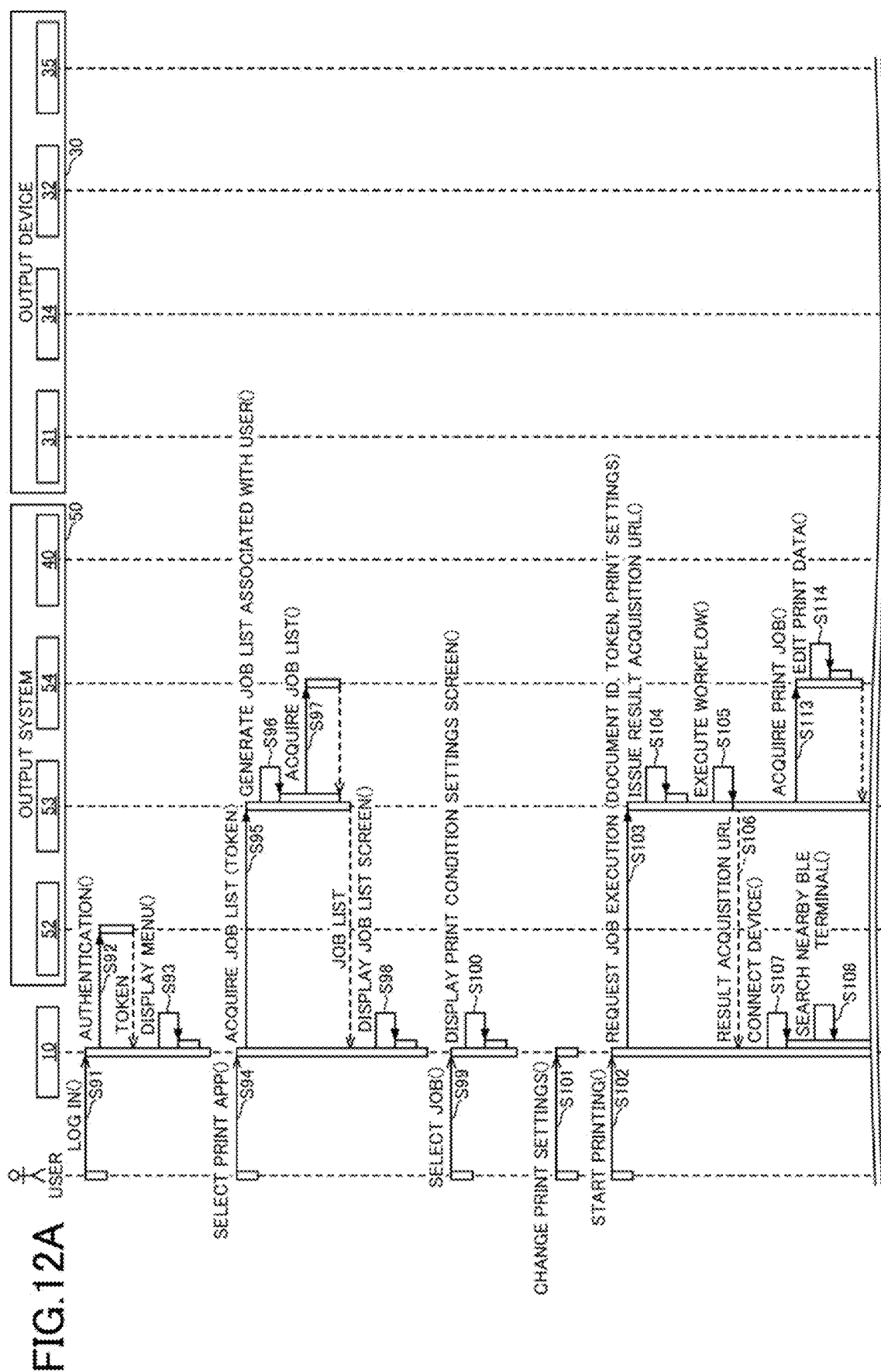
FIG. 12A is an example of a sequence diagram illustrating a procedure for the user to print the print job (document) registered in the output system from the output device by providing a result acquisition URL to the information processing device instead of a signature URL (No. 1)
Figure 12B:
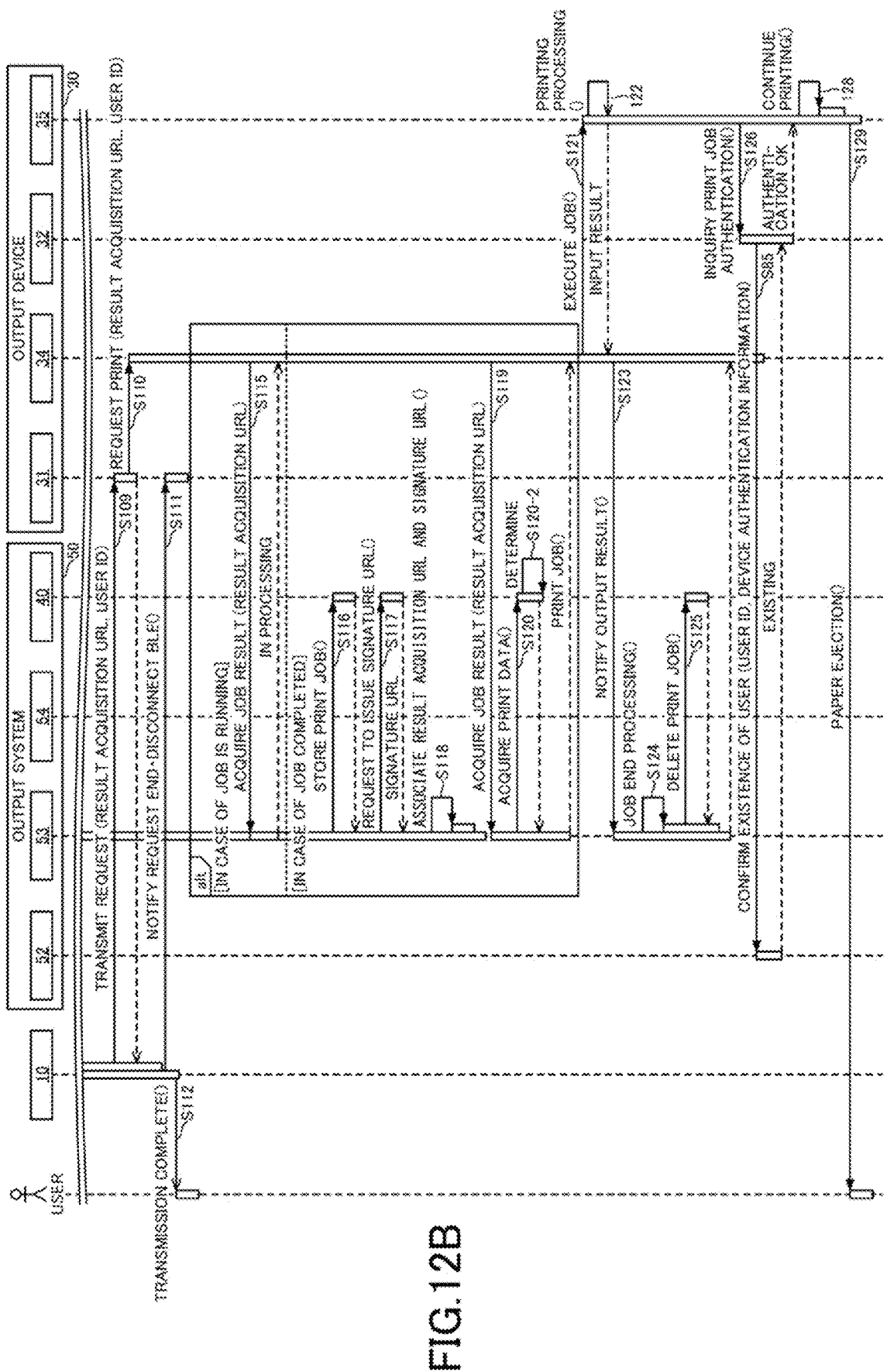
FIG. 12B is an example of a sequence diagram illustrating a procedure for the user to print the print job (document) registered in the output system from the output device by providing a result acquisition URL to the information processing device instead of a signature URL (No. 2)

A flow of the pull printing of the present embodiment will be described with reference to FIG. 12A and FIG. 12B. FIG. 12A and FIG. 12B are examples of sequence diagrams illustrating a procedure for the user to print the print job (document) registered in the output system from the output device by providing a result acquisition URL to the information processing device instead of the signature URL. In the description of FIG. 12, the difference from FIG. 11 will be mainly described.

S91 to S103 may be the same as steps S51 to S63 in FIG. 11.

S104: Upon receiving the execution request of the print job, the processing control unit 53 issues the result acquisition URL. Similar to the signature URL, the result acquisition URL is a URL (a type of signature URL) indicating a storage destination that does not require authentication. However, since the result acquisition URL is not the actual storage destination, any identification information whose uniqueness is guaranteed may be used. The processing control unit 53 stores the result acquisition URL. When the information processing device 10 determines whether the signature URL or the information of the URL format has been received, the processing control unit 53 may issue the result acquisition URL. The information processing device 10 can start short-range communication after confirming that the signature URL or the information of the URL format (the result acquisition URL) has been acquired.

S105: Subsequently, the processing control unit 53 starts executing the print job.

S106: The processing control unit 53 transmits the result acquisition URL to the information processing device 10 as a response to the execution request of the print job in step S103 via the second communication unit 51.

S107: In the present embodiment, when the first communication unit 11 of the information processing device 10 receives the result acquisition URL instead of the signature URL, the first short-range communication unit 14 starts short-range wireless communication. The first communication unit 11 may check whether the result acquisition URL in the same format as the signature URL has been received, or may consider that the result acquisition URL has been received only by receiving some identification information.

Subsequently, processing in steps S108 to S114 may be the same as in steps S72 to S76, S65, and S66 in FIG. 11. However, the first short-range communication unit 14 of the information processing device 10 transmits the result acquisition URL to the output device 30 in S110.

S115: The print job acquisition unit 34 of the output device 30 that has received the result acquisition URL designates the result acquisition URL to request the output system 50 for a print job execution result. When the output system 50 has not completed the execution of the print job (when the editing of the print data or the acquisition of the print job has not been completed), the third communication unit 55 of the output system 50 returns the busy signal (in processing) to the output device 30. Upon receiving the busy signal, the print job acquisition unit 34 repeats the request at predetermined intervals.

S116, S117: When the output system 50 completes the execution of the print job (when the editing of the print data and the acquisition of the print job are completed), the fourth communication unit 56 transmits the print job to the storage system 40. Further, the processing control unit 53 acquires the signature URL issued by the storage system 40.

S118: The processing control unit 53 stores the signature URL acquired from the storage system 40 and the result acquisition URL of the print job saved in step S104 in association with each other.

FIG. 16 illustrates an example of the result acquisition URL associated with the signature URL. In FIG. 16, the result acquisition URL and the signature URL are associated with the document ID of the print job requested to be output by the information processing device 10.

S119: The print job acquisition unit 34 of the output device 30 designates the result acquisition URL to request the output system 50 for the print job execution result.

S120, S120-2: Since the output system 50 has completed the execution of the print job, the processing control unit 53 designates the signature URL associated with the result acquisition URL via the fourth communication unit 56 to acquire the print job from the storage system 40. By converting the result acquisition URL into the signature URL in this way, the processing control unit 53 can acquire the print job. The print job is transmitted to the output device 30.

S121 to S129 may be the same as steps S79 to S87 in FIG. 11.

<Main Effect>

According to the present embodiment, in addition to the effect of the Embodiment 2, the output system 50 generates the result acquisition URL before editing the print data, acquiring the print job, storing the print job in the storage system 40, and acquiring the signature URL so that the waiting time of the user can be reduced to improve an operability of the user.

Embodiment 4

In the present embodiment, the output system 50 that provides the app in the form of a workflow will be described. The app for pull printing by the user may be, for example, a workflow app that executes a series of processes in order. The app can be built by the tenant administrator or the like by combining components (processing). For example, by combining a document reading component, a transmitting component to the cloud, and the like, an app that uploads and stores a document read by the output device 30 to the storage on the cloud can be configured. Regarding the print job execution app (pull printing application), for example, a different app is prepared for each type of commercial storage service that stores the print job on the output system 50 side.

The app in the form of the workflow can be executed by each user who belongs to the tenant by contracting a license with the tenant. Therefore, the tenant administrator purchases the license of the app in advance and assigns the license to the user. When assigning, a restriction on the app that can be assigned according to the user's role (authority) is included. For example, the tenant administrator cannot assign an app for the tenant administrator to a general user. FIG. 17 is an example of user information corresponding to the app in the form of the workflow.

FIG. 17 schematically illustrates the user information managed by the authentication unit 52. The user information is associated with the tenant ID. That is, the user information exists for each user belonging to the tenant. Note that the tenant administrator is included with respect to the user. The user information is registered by the tenant administrator through connecting to the output system 50.

The user information includes each item of tenant ID, user ID, password, last name, first name, e-mail address, display language (locale), account status, role, and app usage permission. The tenant ID is identification information of the tenant to which the user belongs. The user ID is user identification information. The password is confidential information that proves the user. The last name is the user's last name. The first name is the user's first name. The e-mail address is the user's e-mail address. The display language is a language of characters displayed on the screen used by the user. The account is a right for the user to log in to one or more information processing devices 10. At least three account statuses are provided ("valid", "invalid", and "account locked"). If the user information is temporarily registered, the account status is "invalid", and the account status becomes "valid" by the main registration. Even after the account status becomes valid, the account can be set "invalid" by the tenant administrator. "Account locked" is set when the user makes a mistake in the password several times while the account status is valid. "Account locked" differs from "invalid" by, for example, returning to "valid" after a period of time, or by remaining counted as a user belonging to the tenant. The role is a user's authority. For example, the authority is "tenant administrator" or "general user". In the present embodiment, the tenant administrator and the general user are referred to as users. The app usage permission is a list of apps (workflow apps) available to the user. A list of apps to which the user has been assigned usage permission is provided.

<Pull Printing Processing>

Subsequently, a flow of the pull printing of the present embodiment will be described with reference to FIG. 13. FIG. 13 is an example of a sequence diagram illustrating a procedure for the user to print the print job (document) registered in the output system from the output device by executing the app in the form of the workflow. In the description of FIG. 13, the difference from FIG. 12 will be mainly described. In the processing of FIG. 13, steps S141 and subsequent steps are omitted.

S131 to S133: When the authentication is successful, the first communication unit 11 of the information processing device 10 designates the token to acquire a list of workflow apps associated with the user who has succeeded in the authentication. The processing control unit 53 refers to the user information to create a list of apps to which the usage permission is assigned to the user. The output system 50 transmits the list of apps to the information processing device 10.

S134: The first communication unit 11 of the information processing device 10 receives the list of apps, and the display control unit 13 displays the list of apps on the menu screen.

Subsequent processing may be the same as in FIG. 12.

<Main Effect>

According to the present embodiment, in addition to the effect of Embodiment 3, the information processing device 10 does not display the workflow that cannot be used by the user, so that the user does not become lost at the time of execution, which improves convenience for the user.

Other Application Examples

Although the best way for implementing the present disclosure has been described above with reference to embodiments, the present disclosure is not limited to above-described examples, and various modifications and substitutions may be made without departing from the scope of the present disclosure.

For example, not only the information processing device 10 but also the output device can display a list of print jobs.

The user can select the print job to print on the output device 30. Further, in this case, the user can set the print settings on the output device 30.

Further, in the present embodiment, the image forming device is mainly used as the output device 30, but the output device 30 is not limited to the image forming device. The output device 30 may include, for example, a projector (PJ), an Interactive White Board (IWB: a whiteboard with an electronic blackboard function available for mutual communication), an output device such as digital signage, a Head-Up Display (HUD) device, industrial machinery, an imaging device, a sound collector, medical equipment, network appliances, a Connected Car, a laptop, a mobile phone, a smartphone, a tablet, a game console, a Personal Digital Assistant (PDA), a digital camera, a wearable PC, a desktop PC, and the like.

Further, the configuration example such as illustrated in FIG. 6 is divided according to the main functions to facilitate understanding of the process by the information processing device 10, the output system 50, and the output device 30. The present disclosure is not limited by the method of dividing the processing unit or the name of the processing unit. The information processing device 10, the output system 50, and the output device 30 may be divided into more processing units according to the process content. Further, a single processing unit may be divided so as to include more processes.

Further, the device group described in the embodiments is only one of multiple computing environments for implementing the embodiments disclosed in the present specification. The output system 50 may include multiple computing devices, such as a server cluster. The multiple computing devices are configured to communicate with each other via any type of communication link, including such as a network and a shared memory, and to perform the processes disclosed herein.

Further, the output system 50 can be configured to share the disclosed process steps, for example, FIG. 9 and the like in various combinations. For example, a process executed by a predetermined unit can be executed by multiple information processing devices included in the output system 50. Further, the output system 50 may be integrated into a single server device or may be distributed across a plurality of devices.

Further, each of the functions of the above-described embodiment may be implemented by one or more processing circuits or circuitry. As used herein, the "processing circuit" includes a processor programmed to perform each function by software, such as a processor implemented in electronic circuits, an application specific integrated circuit (ASIC) designed to perform each function as described above, a digital signal processor (DSP), a field programmable gate array (FPGA), or a conventional circuit module.

What is claimed is:

1. An information processing system, comprising:
an output system; and
an information processing device including first processing circuitry configured to
transmit, to the output system, an output request with respect to data, and
receive, from the output system, identification information for identifying the output request with respect to the data, wherein the output system includes second processing circuitry configured to:
acquire the identification information issued for the output request with respect to the data in response to the output request from the information processing device,
transmit, to the information processing device, the acquired identification information, and
transmit, to an output device, the data acquired from a storage destination associated with the identification information, upon receiving from the output device the output request of the data with the identification information being designated, and
in a case that the data is a print job and the information processing device transmits the output request with respect to the print job, the identification information acquired by the second processing circuitry is different for each output request even if the output requests are for a same print job.

2. The information processing system according to claim 1, wherein
the first processing circuitry of the information processing device is further configured to search for the output device by wireless communication, upon receiving the identification information from the output system,
the identification information is transmitted to the output device, upon communicating with the output device, and
the second processing circuitry accepts the output request of the data that designates the identification information received by the output device from the information processing device.

3. The information processing system according to claim 2, wherein
the first processing circuitry transmits, to the output device, user identification information specified by successful authentication of a user, and
the output device requests the output system to authenticate the user by using the user identification information received from the information processing device, and outputs the data upon the authentication of the user being successful.

4. The information processing system according to claim 2, wherein
the second processing circuitry transmits, to the information processing device, second identification information for identifying the output request with respect to the data, upon receiving the output request with respect to the data from the information processing device, and associates the second identification information and the identification information for identifying the output request with respect to the data,
the first processing circuitry transmits, to the output device, the second identification information, and
the second processing circuitry, upon receiving from the output device the output request of the data with the second identification information being designated, specifies the identification information associated with the second identification information, and transmits, to the output device, the data acquired from the storage destination associated with the identification information.

5. The information processing system according to claim 4, wherein the second identification information is a signature URL.

6. The information processing system according to claim 1, wherein user identification information specified by successful authentication of a user is embedded in the data requested to be output from the information processing device, and the output device requests the output system to authenticate the user by using the user identification information included in the data received from the output system, and outputs the data upon the authentication of the user being successful.

7. The information processing system according to claim 1, wherein when the output device outputs the data, the identification information is designated and an output result of the data is transmitted to the output system, and the output system deletes the data from the storage destination associated with the identification information.

8. The information processing system according to claim 1, wherein the identification information issued for the output request of the data is a signature URL.

9. The information processing system according to claim 1, wherein the first processing circuitry of the information processing device is further configured to:
 display a list of the received data, and
 accept a selection of the displayed data, the first processing circuitry transmits, to the output system, third identification information of the data, and the second processing circuitry acquires fourth identification information issued for the output request with respect to the data in response to receiving the third identification information of the data.

10. The information processing system according to claim 1, wherein the data is a print job, the output system accepts execution of the print job as execution of a workflow application, and manages the workflow application for each user, the workflow application being capable of being used by the user, the second processing circuitry transmits, to the information processing device, the workflow application capable of being used by the user specified by successful authentication of the user, and the information processing device further includes a display control circuit configured to display a list of the workflow application and an operation receiver configured to accept a selection of the workflow application that accepts the execution of the print job from the list of the workflow application.

11. An output method, comprising:

transmitting, by an information processing device to an output system, an output request with respect to data;

receiving, by the information processing device from the output system, identification information for identifying the output request with respect to the data;

acquiring, by the output system, the identification information issued for the output request with respect to the data in response to the output request from the information processing device;

transmitting, by the output system, the identification information acquired to the information processing device; and transmitting, by the output system to the output device, the data acquired from a storage destination associated with the identification information, upon receiving from the output device the output request of the data with the identification information being designated, wherein in a case that the data is a print job and the output request is transmitted with respect to the print job, the identification information acquired in the acquiring is different for each output request even if the output requests are requested for a same print job.

12. A non-transitory computer readable medium storing computer executable instructions which, when executed by an output system that communicates with an information processing device, cause the output system to:

acquire identification information issued for an output request with respect to the data in response to the output request from the information processing device;

transmit, to the information processing device, the acquired identification information;

transmit, to an output device, the data acquired from a storage destination associated with the identification information, upon receiving from the output device the output request of the data with the identification information being designated, wherein the information processing device includes processing circuitry configured to transmit, to the output system, an output request with respect to data, and to receive, from the output system, identification information for identifying the output request with respect to the data, and in a case that the data is a print job and the output request is transmitted with respect to the print job, the identification information acquired in the acquiring is different for each output request even if the output requests are requested for a same print job.

* * * * *